US009230405B2

(12) United States Patent

Baerlocher et al.

(10) Patent No.: US 9,230,405 B2

(45) Date of Patent: *Jan. 5, 2016

(54) GAMING SYSTEM, GAMING DEVICE, AND METHOD PROVIDING POKER GAME WITH AWARDS BASED ON ODDS OF WINNING

(71) Applicant: IGT, Reno, NV (US)

(72) Inventors: Anthony J. Baerlocher, Henderson, NV (US); Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/898,112

(22) Filed: May 20, 2013

(65) Prior Publication Data

US 2013/0267292 A1 Oct. 10, 2013

Related U.S. Application Data

(63) Continuation of application No. 12/014,576, filed on Jan. 15, 2008, now Pat. No. 8,449,363.

(60) Provisional application No. 60/986,520, filed on Nov. 8, 2007.

(51) Int. Cl.
*G06F 19/00* (2011.01)
*G07F 17/32* (2006.01)

(52) U.S. Cl.
CPC ........ *G07F 17/3293* (2013.01); *G07F 17/3276* (2013.01)

(58) Field of Classification Search
None
See application file for complete search history.

(56) References Cited

U.S. PATENT DOCUMENTS

| | | | |
|---|---|---|---|
| 4,676,506 | A | 6/1987 | Crouch |
| 4,743,022 | A | 5/1988 | Wood |
| 5,019,973 | A | 5/1991 | Wilcox et al. |
| 5,248,142 | A | 9/1993 | Breeding |
| 5,393,067 | A | 2/1995 | Paulsen et al. |
| 5,401,023 | A | 3/1995 | Wood |
| 5,511,784 | A | 4/1996 | Furry et al. |
| 5,788,574 | A | 8/1998 | Ornstein et al. |
| 5,806,855 | A | 9/1998 | Cherry |
| 5,830,067 | A | 11/1998 | Graves et al. |
| 5,839,730 | A | 11/1998 | Pike |

(Continued)

OTHER PUBLICATIONS

2005 World Series of Poker screens shots, 2 pp, published on You Tube, Feb. 11, 2013.*

(Continued)

*Primary Examiner* — Paul A D'Agostino
(74) *Attorney, Agent, or Firm* — Neal, Gerber & Eisenberg LLP

(57) ABSTRACT

A gaming device includes a poker game where two cards are dealt face-up to at least one player and to a dealer. The gaming device enables the player to place an optional wager based on the initially dealt two card hand. A pay out for the optional wager is determined based on the probability that the final player hand will outrank the final dealer hand. The pay out is inversely proportional to the probability that the player will win. Therefore, if the player has a high probability of winning, the associated pay out will be relatively small. Also, if the player has a low probability of winning, the associated pay out will be relatively large. The gaming device enables the player to place multiple wagers after each of a plurality of community cards are dealt, where the associated pay out changes according to a revised probability of winning.

17 Claims, 20 Drawing Sheets

(56) References Cited

U.S. PATENT DOCUMENTS

| | | | | |
|---|---|---|---|---|
| 5,911,418 | A | 6/1999 | Adams | |
| 5,967,894 | A | 10/1999 | Kinoshita et al. | |
| 6,068,552 | A | 5/2000 | Walker et al. | |
| 6,159,097 | A | 12/2000 | Gura | |
| 6,186,894 | B1 | 2/2001 | Mayeroff | |
| 6,213,877 | B1 | 4/2001 | Walker et al. | |
| 6,224,483 | B1 | 5/2001 | Mayeroff | |
| 6,227,969 | B1 | 5/2001 | Yoseloff | |
| 6,231,442 | B1 | 5/2001 | Mayeroff | |
| 6,238,288 | B1 | 5/2001 | Walker et al. | |
| 6,248,016 | B1 | 6/2001 | Walker et al. | |
| 6,257,979 | B1 | 7/2001 | Walker et al. | |
| 6,322,451 | B1 * | 11/2001 | Miura | 463/42 |
| 6,332,614 | B1 | 12/2001 | Hesse | |
| 6,332,839 | B2 | 12/2001 | Walker et al. | |
| 6,358,147 | B1 | 3/2002 | Jaffe et al. | |
| 6,422,940 | B1 | 7/2002 | Walker et al. | |
| 6,425,823 | B1 | 7/2002 | Byrne | |
| 6,517,073 | B1 | 2/2003 | Vancura | |
| 6,569,014 | B2 | 5/2003 | Walker et al. | |
| 6,607,195 | B2 | 8/2003 | Vancura | |
| 6,637,747 | B1 | 10/2003 | Garrod | |
| 6,679,492 | B2 | 1/2004 | Markowiak | |
| 6,702,289 | B1 | 3/2004 | Feola | |
| 6,896,264 | B1 | 5/2005 | Haber | |
| 7,029,395 | B1 | 4/2006 | Baerlocher | |
| 7,114,718 | B2 | 10/2006 | Grauzer et al. | |
| 7,169,051 | B1 * | 1/2007 | Mossbarger | 463/42 |
| 7,201,655 | B2 | 4/2007 | Walker et al. | |
| 7,264,243 | B2 * | 9/2007 | Yoseloff et al. | 273/292 |
| 7,306,516 | B2 | 12/2007 | Iosilevsky | |
| 7,329,179 | B2 | 2/2008 | Baerlocher | |
| 7,677,573 | B2 | 3/2010 | Webb | |
| 7,794,324 | B2 | 9/2010 | White et al. | |
| 8,074,991 | B2 | 12/2011 | Chen et al. | |
| 8,210,926 | B2 | 7/2012 | Asher et al. | |
| 8,360,845 | B1 * | 1/2013 | Hsu | 463/17 |
| 8,398,473 | B2 | 3/2013 | Baerlocher et al. | |
| 2002/0034981 | A1 | 3/2002 | Hisada | |
| 2002/0103018 | A1 | 8/2002 | Rommerdahl et al. | |
| 2002/0173352 | A1 | 11/2002 | Oliveras | |
| 2002/0195775 | A1 * | 12/2002 | Webb et al. | 273/292 |
| 2003/0073476 | A1 | 4/2003 | Friedman | |
| 2003/0195043 | A1 | 10/2003 | Shinners et al. | |
| 2003/0199294 | A1 | 10/2003 | Walker et al. | |
| 2003/0232651 | A1 | 12/2003 | Huard et al. | |
| 2004/0023715 | A1 | 2/2004 | Luciano | |
| 2004/0087357 | A1 | 5/2004 | Johnson | |
| 2004/0143852 | A1 * | 7/2004 | Meyers | 725/133 |
| 2004/0235542 | A1 | 11/2004 | Stronach et al. | |
| 2004/0248635 | A1 | 12/2004 | Efremov | |
| 2005/0032563 | A1 | 2/2005 | Sines | |
| 2005/0054429 | A1 | 3/2005 | Baerlocher et al. | |
| 2005/0060050 | A1 | 3/2005 | Baerlocher | |
| 2005/0096123 | A1 | 5/2005 | Cregan et al. | |
| 2005/0107148 | A1 | 5/2005 | Webb | |
| 2005/0192097 | A1 * | 9/2005 | Farnham et al. | 463/42 |
| 2005/0282605 | A1 | 12/2005 | Englman et al. | |
| 2006/0046816 | A1 | 3/2006 | Walker et al. | |
| 2006/0121990 | A1 * | 6/2006 | O'Kelley et al. | 463/42 |
| 2006/0128457 | A1 | 6/2006 | Cannon | |
| 2006/0131810 | A1 | 6/2006 | Nicely | |
| 2006/0135240 | A1 | 6/2006 | Barshack | |
| 2006/0178206 | A1 | 8/2006 | Kraft et al. | |
| 2006/0186598 | A1 | 8/2006 | Coussa | |
| 2006/0217167 | A1 * | 9/2006 | Jubinville et al. | 463/13 |
| 2006/0217169 | A1 | 9/2006 | Manber | |
| 2006/0223605 | A1 | 10/2006 | Pullman | |
| 2006/0246976 | A1 | 11/2006 | Sines | |
| 2006/0287097 | A1 | 12/2006 | Moshal | |
| 2007/0021182 | A1 | 1/2007 | Gauselmann | |
| 2007/0035548 | A1 * | 2/2007 | Jung et al. | 345/474 |
| 2007/0040332 | A1 | 2/2007 | Noyes | |
| 2007/0075490 | A1 | 4/2007 | Gak | |
| 2007/0087804 | A1 | 4/2007 | Knowles et al. | |
| 2007/0129129 | A1 | 6/2007 | Tinghitella | |
| 2007/0135195 | A1 | 6/2007 | Albino | |
| 2007/0184889 | A1 | 8/2007 | Walker et al. | |
| 2007/0200297 | A1 | 8/2007 | Flangas | |
| 2008/0012222 | A1 | 1/2008 | Starzec | |
| 2008/0067744 | A1 | 3/2008 | Heravi | |
| 2008/0088087 | A1 | 4/2008 | Weitzman et al. | |
| 2008/0207297 | A1 | 8/2008 | Zilba | |
| 2008/0214292 | A1 | 9/2008 | Bryant et al. | |
| 2008/0237985 | A1 | 10/2008 | Cogert et al. | |
| 2008/0252011 | A1 | 10/2008 | Bickley et al. | |
| 2008/0311981 | A1 * | 12/2008 | Schugar | 463/26 |
| 2008/0318651 | A1 | 12/2008 | Gross et al. | |

OTHER PUBLICATIONS

Texas Holdem Video Poker, website http://www.simtel.net/product/php?id=75013&SiteId=simtel.net printed on Sep. 17, 2008, 3 pages.

* cited by examiner

FIG. 3A

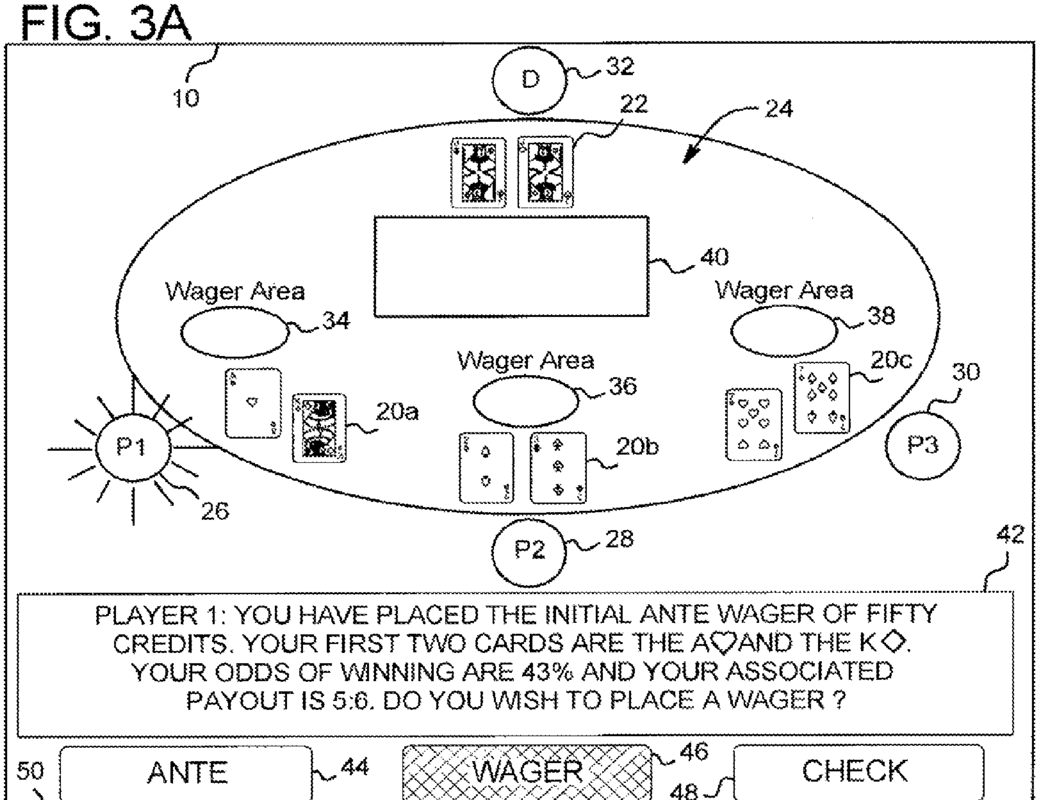

42

PLAYER 1: YOU HAVE PLACED THE INITIAL ANTE WAGER OF FIFTY CREDITS. YOUR FIRST TWO CARDS ARE THE A♡AND THE K◇. YOUR ODDS OF WINNING ARE 43% AND YOUR ASSOCIATED PAYOUT IS 5:6. DO YOU WISH TO PLACE A WAGER ?

ANTE 44 WAGER 46 48 CHECK

50

| SUMMARY TABLE | PLAYER 1 | PLAYER 2 | PLAYER 3 |
|---|---|---|---|
| INITIAL CARDS | A♡K◇ | 2♤3♧ | 7♡7♤ |
| ODDS OF WINNING | 43% | 14% | 19% |
| ASSOCIATED PAYOUT | 5:6 | 6:1 | 5:1 |
| BET PLACED ON INITIAL CARDS | | | |
| FLOP CARD | | | |
| ODDS OF WINNING | | | |
| ASSOCIATED PAYOUT | | | |
| BET PLACED ON FLOP CARD | | | |
| TURN CARD | | | |
| ODDS OF WINNING | | | |
| ASSOCIATED PAYOUT | | | |
| BET PLACED ON TURN CARD | | | |
| RIVER CARD | | | |
| FINAL HAND | | | |
| TOTAL WAGER | 50 | 50 | 50 |
| AWARD | | | |

FIG. 3C

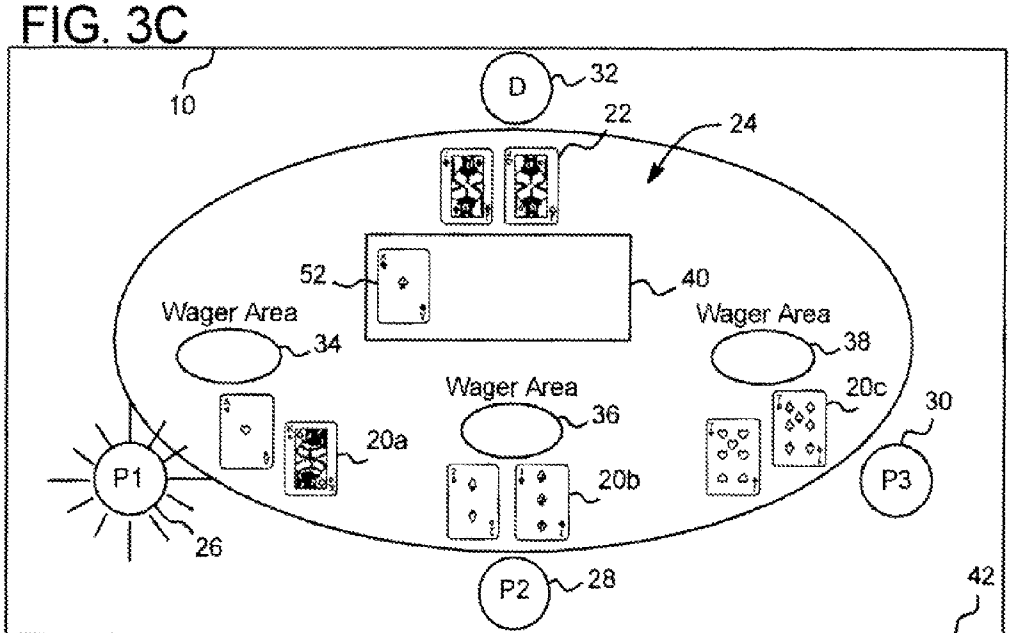

PLAYER 1: YOU HAVE PLACED A WAGER OF TWELVE CREDITS ON THE INITIAL CARDS. THE FLOP CARD IS THE A♣ YOUR ODDS OF WINNING ARE 80% AND YOUR ASSOCIATED PAYOUT CHANGES TO 2:3. DO YOU WISH TO PLACE ANOTHER WAGER ON THE FLOP CARD ?

ANTE 44 | WAGER 46 | 48 CHECK

50

| SUMMARY TABLE | PLAYER 1 | PLAYER 2 | PLAYER 3 |
|---|---|---|---|
| INITIAL CARDS | A♥K♦ | 2♠3♣ | 7♥7♦ |
| ODDS OF WINNING | 43% | 14% | 19% |
| ASSOCIATED PAYOUT | 5:6 (22) | 6:1 (140) | 5:1 (60) |
| BET PLACED ON INITIAL CARDS | 12 | 20 | 10 |
| FLOP CARD | A♣ | A♣ | A♣ |
| ODDS OF WINNING | 80% | 13% | 15% |
| ASSOCIATED PAYOUT | 2:3 | 6:1 | 6:1 |
| BET PLACED ON FLOP CARD | | | |
| TURN CARD | | | |
| ODDS OF WINNING | | | |
| ASSOCIATED PAYOUT | | | |
| BET PLACED ON TURN CARD | | | |
| RIVER CARD | | | |
| FINAL HAND | | | |
| TOTAL WAGER | 62 | 70 | 60 |
| AWARD | | | |

FIG. 3E

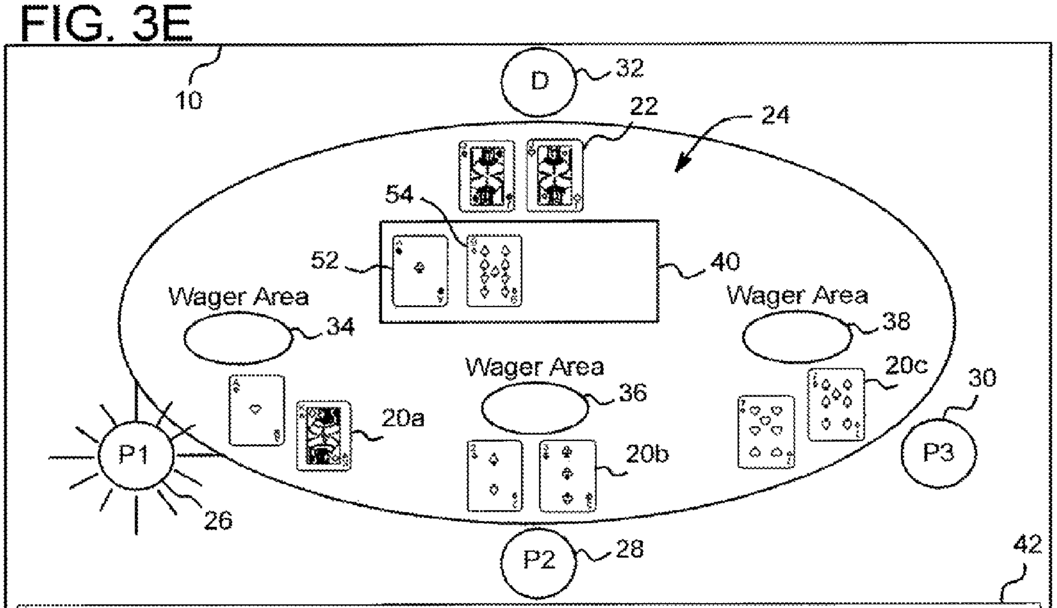

42

PLAYER 1: YOU HAVE PLACED A WAGER OF TWENTY-FOUR CREDITS ON THE FLOP CARD. THE TURN CARD IS THE 9♤ YOUR ODDS OF WINNING ARE NOW 85% AND YOUR ASSOCIATED PAYOUT CHANGES TO 1:3. DO YOU WISH TO PLACE ANOTHER WAGER ON THE TURN CARD ?

50 ANTE 44 WAGER 46 48 CHECK

| SUMMARY TABLE | PLAYER 1 | PLAYER 2 | PLAYER 3 |
|---|---|---|---|
| INITIAL CARDS | A♡K♢ | 2♤3♧ | 7♡7♤ |
| ODDS OF WINNING | 43% | 14% | 19% |
| ASSOCIATED PAYOUT | 5:6 (22) | 6:1 (140) | 5:1 (60) |
| BET PLACED ON INITIAL CARDS | 12 | 20 | 10 |
| FLOP CARD | A♧ | A♧ | A♧ |
| ODDS OF WINNING | 80% | 13% | 15% |
| ASSOCIATED PAYOUT | 2:3 (40) | 6:1 (35) | 6:1 (140) |
| BET PLACED ON FLOP CARD | 24 | 5 | 20 |
| TURN CARD | 9♤ | 9♤ | 9♤ |
| ODDS OF WINNING | 85% | 13% | 15% |
| ASSOCIATED PAYOUT | 1:3 | 13:2 | 6:1 |
| BET PLACED ON TURN CARD | | | |
| RIVER CARD | | | |
| FINAL HAND | | | |
| TOTAL WAGER | 86 | 75 | 80 |
| AWARD | | | |

FIG. 3G

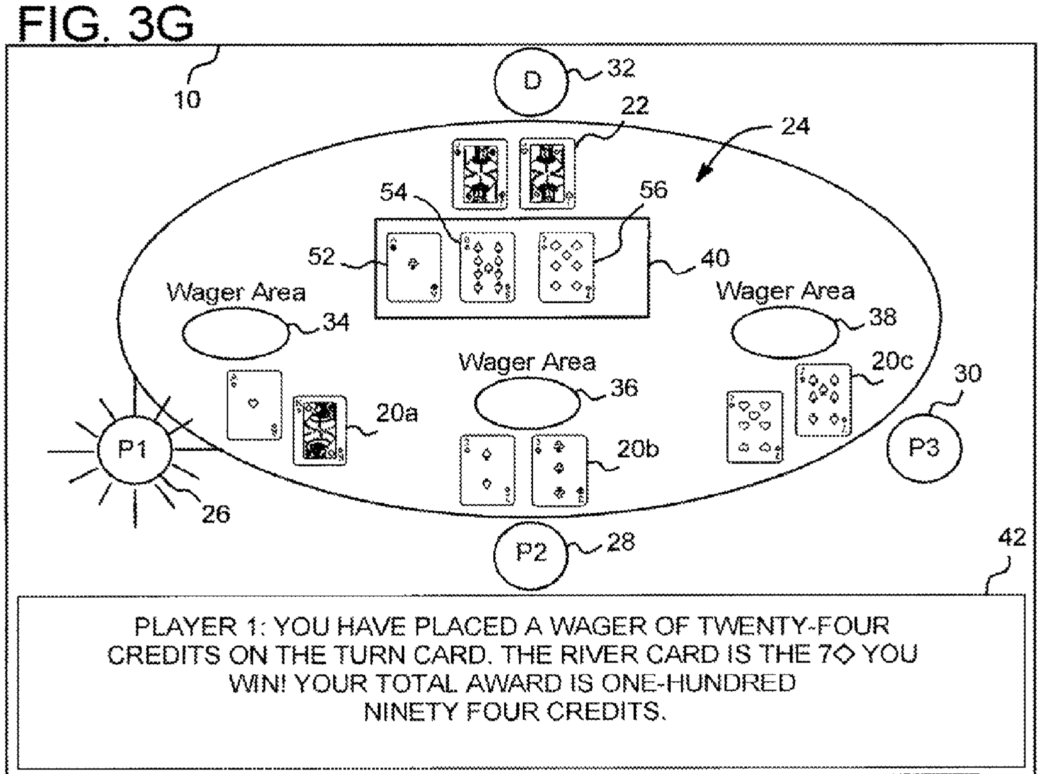

42

PLAYER 1: YOU HAVE PLACED A WAGER OF TWENTY-FOUR CREDITS ON THE TURN CARD. THE RIVER CARD IS THE 7◇ YOU WIN! YOUR TOTAL AWARD IS ONE-HUNDRED NINETY FOUR CREDITS.

ANTE 44 | WAGER 46 | 48 CHECK

50

| SUMMARY TABLE | PLAYER 1 | PLAYER 2 | PLAYER 3 |
|---|---|---|---|
| INITIAL CARDS | A♡K◇ | 2♤3♧ | 7♡7♤ |
| ODDS OF WINNING | 43% | 14% | 19% |
| ASSOCIATED PAYOUT | 5:6 (22) | 6:1 (140) | 5:1 (60) |
| BET PLACED ON INITIAL CARDS | 12 | 20 | 10 |
| FLOP CARD | A♧ | A♧ | A♧ |
| ODDS OF WINNING | 80% | 13% | 15% |
| ASSOCIATED PAYOUT | 2:3 (40) | 6:1 (35) | 6:1 (140) |
| BET PLACED ON FLOP CARD | 24 | 5 | 20 |
| TURN CARD | 9♤ | 9♤ | 9♤ |
| ODDS OF WINNING | 85% | 13% | 15% |
| ASSOCIATED PAYOUT | 1:3 (32) | 13:2 (37) | 6:1 (70) |
| BET PLACED ON TURN CARD | 24 | 5 | 10 |
| RIVER CARD | 7◇ | 7◇ | 7◇ |
| FINAL HAND | A♡A♧K◇9♤7◇ | A♧9♤7◇3♧2♤ | 7♡7♤7◇A♧9♤ |
| TOTAL WAGER | 110 | 80 | 90 |
| AWARD | 194 | 0 | 370 |

FIG. 4A

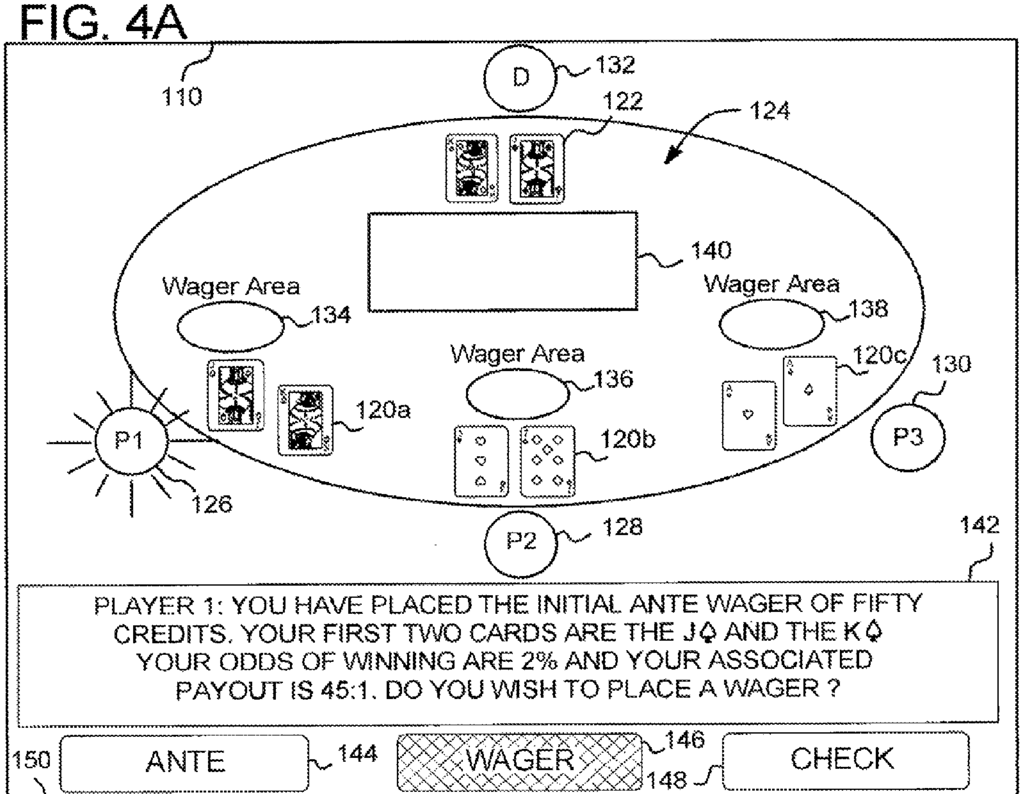

PLAYER 1: YOU HAVE PLACED THE INITIAL ANTE WAGER OF FIFTY CREDITS. YOUR FIRST TWO CARDS ARE THE J♤ AND THE K♤ YOUR ODDS OF WINNING ARE 2% AND YOUR ASSOCIATED PAYOUT IS 45:1. DO YOU WISH TO PLACE A WAGER ?

150 ANTE 144 WAGER 146 148 CHECK

| SUMMARY TABLE | PLAYER 1 | PLAYER 2 | PLAYER 3 |
|---|---|---|---|
| INITIAL CARDS | J♤K♤ | 3♡7◇ | A♤A♡ |
| ODDS OF WINNING | 2% | 31% | 83% |
| ASSOCIATED PAYOUT | 45:1 | 3:1 | 1:4 |
| BET PLACED ON INITIAL CARDS | | | |
| FLOP CARD | | | |
| ODDS OF WINNING | | | |
| ASSOCIATED PAYOUT | | | |
| BET PLACED ON FLOP CARD | | | |
| TURN CARD | | | |
| ODDS OF WINNING | | | |
| ASSOCIATED PAYOUT | | | |
| BET PLACED ON TURN CARD | | | |
| RIVER CARD | | | |
| FINAL HAND | | | |
| TOTAL WAGER | 50 | 50 | 50 |
| AWARD | | | |

FIG. 4C

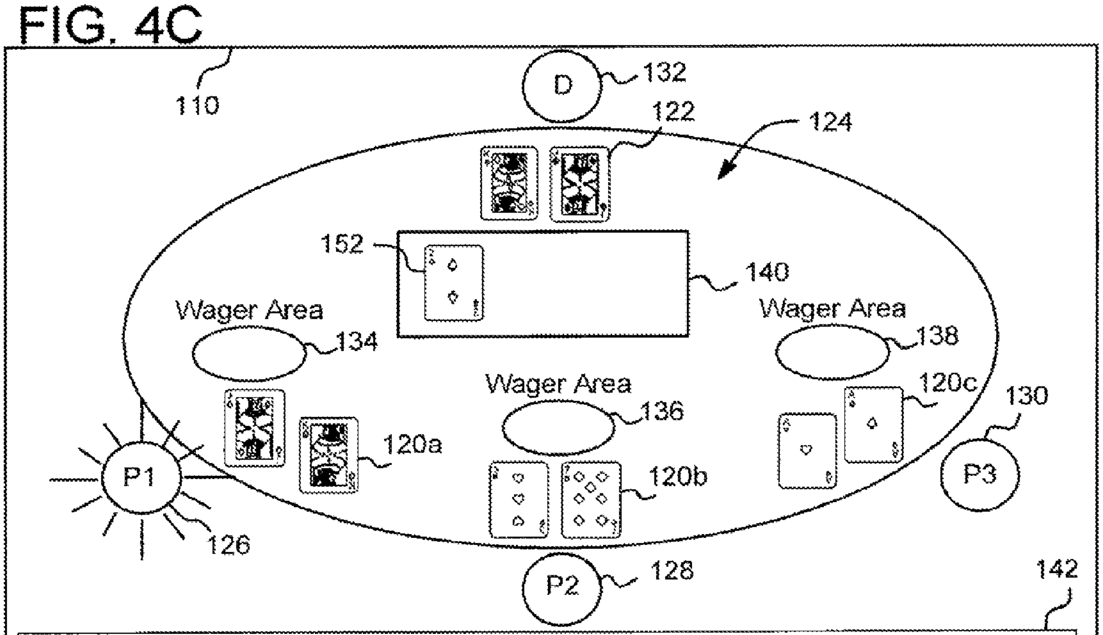

142

PLAYER 1: YOU HAVE PLACED A WAGER OF TEN CREDITS ON THE INITIAL CARDS. THE FLOP CARD IS THE 2 ♤ YOUR ODDS OF WINNING ARE 6% AND YOUR ASSOCIATED PAYOUT CHANGES TO 15:1. DO YOU WISH TO PLACE ANOTHER WAGER ON THE FLOP CARD ?

ANTE 144 | WAGER 146 | 148 CHECK

150

| SUMMARY TABLE | PLAYER 1 | PLAYER 2 | PLAYER 3 |
|---|---|---|---|
| INITIAL CARDS | J♤K♤ | 3♡7◇ | A♤A♡ |
| ODDS OF WINNING | 2% | 31% | 83% |
| ASSOCIATED PAYOUT | 45:1 (460) | 3:1 (160) | 1:4 (250) |
| BET PLACED ON INITIAL CARDS | 10 | 40 | 200 |
| FLOP CARD | 2♤ | 2♤ | 2♤ |
| ODDS OF WINNING | 6% | 22% | 87% |
| ASSOCIATED PAYOUT | 15:1 | 4:1 | 1:5 |
| BET PLACED ON FLOP CARD | | | |
| TURN CARD | | | |
| ODDS OF WINNING | | | |
| ASSOCIATED PAYOUT | | | |
| BET PLACED ON TURN CARD | | | |
| RIVER CARD | | | |
| FINAL HAND | | | |
| TOTAL WAGER | 60 | 90 | 250 |
| AWARD | | | |

FIG. 4E

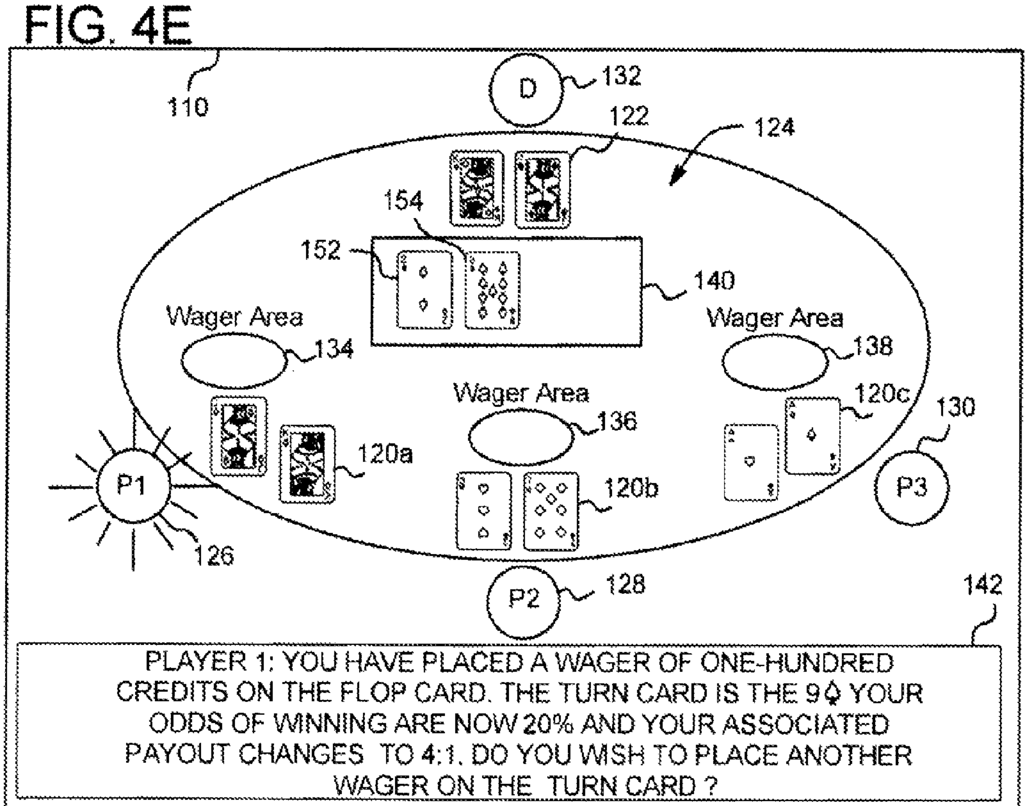

PLAYER 1: YOU HAVE PLACED A WAGER OF ONE-HUNDRED CREDITS ON THE FLOP CARD. THE TURN CARD IS THE 9♤ YOUR ODDS OF WINNING ARE NOW 20% AND YOUR ASSOCIATED PAYOUT CHANGES TO 4:1. DO YOU WISH TO PLACE ANOTHER WAGER ON THE TURN CARD ?

150 ANTE 144 | WAGER 146 | 148 CHECK

| SUMMARY TABLE | PLAYER 1 | PLAYER 2 | PLAYER 3 |
|---|---|---|---|
| INITIAL CARDS | J♤K♤ | 3♡7◇ | A♤A♡ |
| ODDS OF WINNING | 2% | 31% | 83% |
| ASSOCIATED PAYOUT | 45:1 (460) | 3:1 (160) | 1:4 (250) |
| BET PLACED ON INITIAL CARDS | 10 | 40 | 200 |
| FLOP CARD | 2♤ | 2♤ | 2♤ |
| ODDS OF WINNING | 6% | 22% | 87% |
| ASSOCIATED PAYOUT | 15:1 (160) | 4:1 (50) | 1:5 (24) |
| BET PLACED ON FLOP CARD | 10 | 10 | 20 |
| TURN CARD | 9♤ | 9♤ | 9♤ |
| ODDS OF WINNING | 20% | 11% | 100% |
| ASSOCIATED PAYOUT | 4:1 | 8:1 | N/A |
| BET PLACED ON TURN CARD | | | |
| RIVER CARD | | | |
| FINAL HAND | | | |
| TOTAL WAGER | 70 | 100 | 270 |
| AWARD | | | |

FIG. 4G

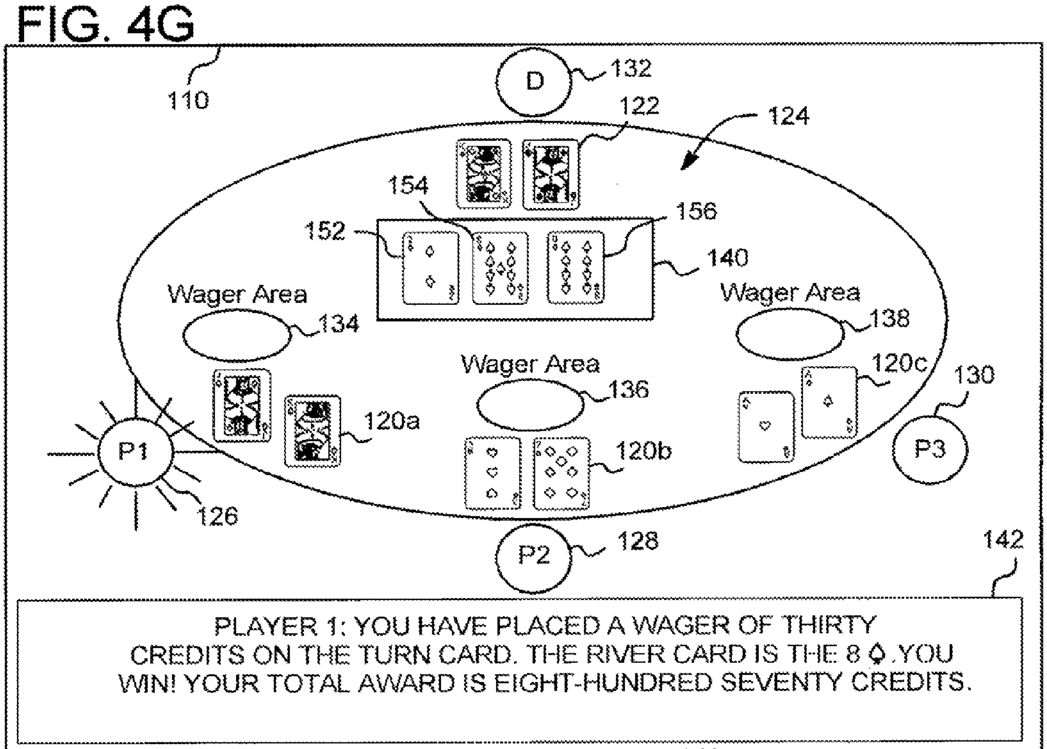

PLAYER 1: YOU HAVE PLACED A WAGER OF THIRTY CREDITS ON THE TURN CARD. THE RIVER CARD IS THE 8 ♠. YOU WIN! YOUR TOTAL AWARD IS EIGHT-HUNDRED SEVENTY CREDITS.

150 ANTE 144 | WAGER 146 | 148 CHECK

| SUMMARY TABLE | PLAYER 1 | PLAYER 2 | PLAYER 3 |
|---|---|---|---|
| INITIAL CARDS | J♠K♠ | 3♥7♦ | A♠A♥ |
| ODDS OF WINNING | 2% | 31% | 83% |
| ASSOCIATED PAYOUT | 45:1 (460) | 3:1 (160) | 1:4 (250) |
| BET PLACED ON INITIAL CARDS | 10 | 40 | 200 |
| FLOP CARD | 2♠ | 2♠ | 2♠ |
| ODDS OF WINNING | 6% | 22% | 87% |
| ASSOCIATED PAYOUT | 15:1 (160) | 4:1 (50) | 1:5 (24) |
| BET PLACED ON FLOP CARD | 10 | 10 | 20 |
| TURN CARD | 9♠ | 9♠ | 9♠ |
| ODDS OF WINNING | 20% | 11% | 100% |
| ASSOCIATED PAYOUT | 4:1 (150) | 8:1 (0) | N/A |
| BET PLACED ON TURN CARD | 30 | 0 | N/A |
| RIVER CARD | 8♠ | 8♠ | 8♠ |
| FINAL HAND | K♠J♠9♠8♠2♠ | 9♠8♠7♦3♥2♠ | A♠A♥9♠8♠2♠ |
| TOTAL WAGER | 100 | 100 | 270 |
| AWARD | 870 | 0 | 374 |

GAMING SYSTEM, GAMING DEVICE, AND METHOD PROVIDING POKER GAME WITH AWARDS BASED ON ODDS OF WINNING

PRIORITY CLAIM

This application is a continuation of, and claims priority to and the benefit of, U.S. patent application Ser. No. 12/014,576, filed or Jan. 15, 2008, which claims priority to and the benefit of U.S. Provisional Patent Application No. 60/986,520, filed on Nov. 8, 2007, now expired, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets live cards dealt face up from a 52 card deck of playing cards. The player can discard none, one, a plurality or all of tie five cards. Each discarded card is replaced with another card from the deck. After the replacement, the cards are evaluated for winning combinations. For a five card poker game, there are ten general categories of hands, ranked ton highest to lowest, as shown to Table 1 below.

TABLE 1

Ranking of Five Card Poker Hands by Category

| Rank | Name | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three of a Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

Within each category, hands are ranked according to the rank of individual cards, with an Ace being the highest card and a two being the lowest card. There is no difference in rank between the four suits of cards. All hands can be ranked in a linear rankings from highest to lowest. Because suits are all the same value, however, them are multiple hands that have identical rankings. For example, there are four equivalent hands for each type of straight flush, four of a kind, or flush. There are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), Omaha (also called Omaha Hold'em), and Pai-Gow Poker. The variations in these games generally differ in the manner in which cards are dealt and in the manner and frequency in which bets are placed. Various criteria may also be used to determine the winning hand, including highest ranking hand, lowest ranking hand (Low-Ball), and where the high and low hands each win half of the pot (High-Low).

In certain known multiplayer variations of poker, the players play against each other rather than against a dealer or house. In certain of these variations, a round of play begins when each player has placed an initial bet, sailed the ante, into the pot. The term pot refers to the total accumulation of antes and wagers made during a particular game. However, in other poker variations, such as Texas Hold'em described in further detail below, only two players at a table make the initial bets, commonly referred to as the blinds.

The number of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold'em, Five Card Stud and Seven Card Stud, each player is initially dealt two cards. These cards are typically dealt face-down. However, depending on the game, some of the cards may be dealt face-up to the player. For example, in Five Card Stud, each player is initially dealt one card face-up and one card face-down. In Texas Hold'em, each player is initially dealt two cards face-down which are commonly referred to as the hole cards.

For certain poker variations where additional cards are dealt or where cards may be replaced, alter the initial deal, a first round of wagering begins, where the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by each remaining player such that each remaining player has wagered the same amount into the pot during the round.

Depending on the variation of poker being player, each game may have only an initial wager or several rounds of wagering, where each round of wagering is generally preceded by dealing one or more cards. If two or more players remain after a particular round of wagering, either more cards are dealt, or there is a race type situation, depending on the game variation being played. A race type situation or a race occurs when two or more players remain in a game after the last round of wagering has been completed for a particular round. A player wins a game of poker either by having the highest ranking hand when a race occurs, or by being the last remaining player in the game after all other players have dropped out or folded. In a race type situation, each player displays the player's hand to the other players so that each player knows what they have and what would need to get in order to beat their opponents. If two or more players have identically ranked hands that are the highest ranking hands, the pot is split evenly between the tying players.

Of the poker variations mentioned above, Texas Hold'em is one of the more popular versions. Texas Hold'em is generally a multi-player card game played at a live card table or via a computer-based virtual card table. In one version of a live card table game of Texas Hold'em, only two players at a table make the initial bets, commonly referred to as the blinds. These blinds include a large blind and a small blind, where the large blind is typically twice the value of the small blind. In a blind based game such as Texas Hold'em, all players are initially eligible to receive a hand, even if they did not place the large blind or the small blind. After the players have anted, each player eligible for play is dealt an initial set of cards. Each of the players must match the blinds, raise the blinds or fold. Texas Hold'em includes a designated number of community cards (i.e., usually five) that can be used by all of the players in combination with their hole cards. However, in certain variations, there may only be three community cards. In certain Texas Hold'em games, the community cards are dealt over the course of several wagering founds. For example, the gaming device or dealer deals the flop (i.e., usually three cards), the turn (usually one card), and the river usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold'em. In other variations of Texas Hold'em, where the number of community cards is only three, the flop is a single card rather than three cards.

Texas Hold'em generally requires two or more players. Certain computer-based versions of the game implement virtual players that use computer heuristics to attempt to allow the virtual players to behave like actual human players.

Certain gaming establishments have an interest in being able to leverage the interest in Texas Hold'em by offering a variation of the game that can be played against the house or casino rather than against other players. This may appeal to players who are waiting to get a seat at a standard table, to those who do not believe they have the skill or bankroll to participate in a standard game, or to those players simply looking for an interesting new casino game.

Existing player versus casino games based on Texas Hold'em generally fall into a few different categories. One type of game has the player attempting to achieve a certain hand outcome relative to a pay table, with assorted betting options and/or requirements along the way. Another type of Texas Hold'em game is based on the outcome of the player's hand relative to that of the dealer's hand, with assorted betting options and/or requirements along the way. Some games offer both type of mechanisms, with the main game based on latter category and an optional side bet based on the former category.

However, Texas Hold'em is generally considered to be a game of skill, where skilled players tend to have a statistical and strategic advantage over lesser skilled players. For example, a skilled player is often able to discern visual clues or tells from their opponents that give them certain information about their opponents' hands. Also, a skilled player may be able to calculate the odds of winning a particular hand or the odds of receiving one or more cards that would be required to win. If the skilled player can do both, they have a distinct advantage over a non-skilled player or a player with lesser skills. Accordingly, certain non-skilled players do not enjoy or may be reluctant to play Texas Hold'em against opponents who are highly skilled. Additionally, certain skilled players may seek out a game of poker with non-skilled players to gain an advantage.

A need therefore exists for new and exciting poker games, including a need for new Texas Hold'em poker games where a non-skilled player is at a lesser disadvantage or at no disadvantage from a skilled player. A need exists for poker games where a showdown or race type situation occurs more frequently such that each player can view each of the cards of the other players. Also, a need exists for new Texas Hold'em poker games where the player can play against a dealer hand and not against other players.

SUMMARY

The gaming system and method of the present disclosure provides various embodiments of multiplayer games where each player is wagering against the house, gaming establishment or casino, and/or playing against one or more of the other players at the gaming table or gaming system. In these games, each player is given at least one and preferably a plurality of opportunities to place wagers, where the pay out associated with each wager is inversely proportional to the probability that the player will achieve a winning outcome at the time the player has the opportunity to make that wager. As such, when the player has a relatively low probability of achieving a winning outcome, the associated pay out with the respective wager is relatively high. Likewise, where the player has a relatively high probability of achieving a winning outcome, the associated pay out with the respective wager is relatively low.

In an embodiment, a type of Texas Hold'Em poker game is provided where multiple players play only against a house hand or dealer hand. Therefore, in this embodiment, the players are not competing against each other. The cards held by the player affect the associated pay outs presented to a player during a play of the game. That is, each player is offered a different pay out for each round of betting based on their overall likelihood of winning against the dealer hand at that point in time. This is determined by the cards they currently have as compared to the cards held by other players at the game and the dealer cards.

In one embodiment of a variation of the Texas Hold'Em game, one to three players plus a dealer play the game, and the players play only against the dealer hand. In an alternative embodiment, more than three players may be able to play the game. At the beginning of the game, players are each required to place an Ante wager against the house. Additionally, at each of the stages, each of the players may place a wager based on their odds of winning against the dealer at that point in the play of the game. The game follows the rules of Texas Hold'Em with each player and the house receiving two hole cards. In an embodiment, because the players are only trying to beat the dealer hand, all of the players are able to view the hole cards of all of the other players. Thus, as the community cards are revealed, an all-in race type situation may occur. In one embodiment, there is no need for bluffing or skill of a player because the payout is effected by the odds of completing a winning hand against the dealer hand.

In one multiplayer embodiment, the players place different types of wagers, where a first type of wager is placed on whether or not the player hand wins against the dealer hand, and where one or more second type of wagers are placed on whether the player wins against all the other player hands. In this embodiment, each of the players place an Ante wager to begin the game and may place subsequent Odds wagers during different stages of the game. The Ante wager is a head to head wager against only the dealer hand. In an embodiment, this Ante wager has a minimum value but no defined maximum values. At the end of the play of the game, if the player beats the dealer hand, even money will be paid on the Ante wager and tie hands are awarded to the house. Alternatively, other pay structures may be defined and used. Because the players are all competing against the house with the Ante wager, it is possible that all players may win this wager. In this embodiment, at least with regard to the Ante wager, the player are not competing with other. However, subsequent to the Ante wager the players have one or more opportunities to place an Odds wager. With regard to the Odds wagers, the players are wagering that their hand will beat all of the other player hands at the table. In one embodiment of a Texas Hold'em style poker game, each of the player's may place an optional Odds wager after the initial two cards are dealt, after the first three community cards (i.e., the flop cards) are dealt, and after the fourth community card (i.e., the turn card) is dealt. It should be appreciated that because in this embodiment, all of the player cards are dealt face-up, there is no wagering opportunity after the fifth community card (i.e., the river card) is dealt. This is due to the fact that the all of the cards in the player hands are known to all of the players and the winner hand is already determined. The payouts associated with each of the Odds wagers are based in part on the probability of the player beating all of the other players at that point in time in the round of play of the game. In one example, a first player's odds of beating all of the other players after that first player's initial two cards are dealt may be low. In this case, the payout associated with any Odds wager would be relatively high. In the same example play of the game, after the flop cards are dealt, the first player's odds of beating the other players may have improved dramatically. In this case, if the first player places another Odds wager, the payout associated with this second Odds wager would be relatively low. Therefore, in this embodiment, players are able to play a single round of play of the game where the players compete against only the dealer with the Ante wager, and against the other players with one or more Odds wagers. Accordingly, in the same play of the game, the players can experience both a sense of camaraderie and a sense of competition.

In an embodiment, either one of the players or an actual dealer will be designated the dealer and receive a dealer button in their play field area. The dealer will deal two cards for each player as well as two cards for a dealer hand. Each player is then able to look at their cards. In one embodiment, all of the players' cards are revealed to each of the players at the table. Because the players are not competing against each other, them is no strategy required for bluffing or concealing the cards.

In an embodiment, once the initial cards have been dealt to all of the players and the house, a first round of wagering occurs before the flop is dealt. Because each player has an initial hand, the gaming device can calculate the odds of winning based on their hand, the dealer's hand, and the other player hands. The gaming device provides or otherwise displays to each player their respective odds of beating the dealer hand. For instance, if Player A has a 5 and a 7 of diamonds, they may have a 12% chance of winning the game and their odds are adjusted accordingly such that the wager they make at this point or stage has a 6:1 pay out on that wager amount. If Player B has a pair of 9's, they may have a 50% chance of winning the game and their odds are adjusted accordingly such that the wager they make at this point or stage has a 5:6 pay out on that wager amount.

After the gaming system provides each player with their respective odds of winning and after each player decides whether to place a wager, the flop card is dealt face-up for the dealer and the players to see. After the flop card is dealt, the gaming system adjusts the odds of winning associated with each player hand based on the flop card. All first bets placed on the initially dealt two card hands still pay at the odds determined for the player at that point in time or stage of the game. However, any additional wagers placed after the flop card is dealt have new calculated odds. For instance, if the flop is a 9 of hearts, Player A's chances of winning drop to about 5% and Player B's chances of winning increase to about 85%. Thus, a wager made at this point (before the turn card is dealt) for Player A may have a 15:1 pay out and a wager made at this point for Player B may have a 1:9 pay out. Each player has the option of not betting, and in one embodiment, this choice will have no effect on the ante or any previous bets by the player and the associated pay out for that bet.

Additionally, the player has another opportunity to wager again before the river card is dealt. As with the previous wagering opportunities, the gaming system adjusts the odds of winning for the next wager or bet. This adjustment is based on the new hand formed by the turn card being dealt and how if positions each player as being likely to win against the remaining player hands.

In an embodiment including both Ante wagers and Odds wagers, upon completion of the game, awards are paid accordingly for each winning hand. For each player, if the player's hand does not beat the dealer hand, the Ante wager placed by the player during the game is lost. For each player, if the player's hand beats all of the other player hands, all Odds wagers placed by the winning player during the game are paid at the odds determined at the time they were placed (i.e., each Odds wager has separate associated payout odds associated with that wager). In this embodiment, because all the cards are dealt face-up and the Odds payouts are based on odds of winning at the time they are placed, there is no opportunity for player collusion against the house whether the playing is playing against the house or against the other players.

In other embodiments, this method of play can be applied to other multi-stage games where the player's chance of winning may change with each stage. For instance, a separate Odds wager can be placed at each stage of a Blackjack game based on the player's chance of beating the dealer hand at a given stage. In other embodiments, a slot machine can be programmed to pause after each reel is spun and allow a player to place a wager on whether their outcome will beat a paytable with pay out odds based on the current likelihood at that stage. In one bingo game embodiment, the player may place Odds wagers after numbers are called. In this bingo style embodiment, the gaming system displays each of the player's bingo cards for all of the other players to view. Therefore, after each bingo number is drawn, the players have a visual and statistical indication of their probability of winning the round of play of the bingo game, and may choose to place one of more Odds wagers based on these probabilities. Further, the concept of placing one or more optional Odds wagers can be applied to any game that has or can be implemented in a multi-stage format.

The embodiments described herein present a method of playing a game wherein the player is able to play against the gaming establishment and is awarded for a comeback type win. This enables a player to remain in a round of play of the game when they may have otherwise folded. In an embodiment, the player can choose to sit out (i.e., not place an Odds wager) for one or more rounds of wagering and then later place an Odds wager prior to the conclusion of the wagering rounds. In another embodiment, if the player chooses to skip a round of wagering, the player is not allowed to place an Odds wager on any later wagering rounds. The above embodiments present an alternative to a standard Texas Hold'Em game that allows for players to root together against the gaming establishment and have multiple winners within one game. Further, by simplifying the stags betting in a Texas Hold'Em game to a single wager based on current odds configurations, the game is able to play at a much faster rate which is desirable by both players and operators.

In one embodiment, the game is played at a live gaming table. In this embodiment, the gaming table includes one or more tracking devices that track the identities of the player and the dealer cards. The gaming system uses the identities of the player cards to determine the odds payouts for each of the players. Moreover, because the cards are dealt face-up and are viewable to all of the players at the table, there is no opportunity for collusion or cheating because the players obtain no advantage by cheating.

In certain of the embodiments discussed above, by having variable odds payouts in the same game, as the round of play of the game progresses, the player's payout odds change based on prior outcomes or prior partial outcomes.

In certain of the embodiments, a player at a poker game is allowed to wager different amounts when they are playing against each other at different points in the game. In traditional poker games, if one player wagers a specific amount the other players must either fold their entire hand or call/raise the first player's wager. However, in certain of the present embodiments, a first player may choose to place a very large wager and the second player can place only a minimal wager or no wager and still stay in the game. However, in a multi-player embodiment including an Ante wager and where there is no dealer hand, it should be appreciated that the initial Ante wagers for each of the players are the same.

One embodiment of the present disclosure provides a gaming system operated at least partially under control of a processor and including a gaming table for a card game. The gaming system includes a gaming table having a tracking system including at least one chip identifier and at least one card tracking mechanism or device. The chip identifier is operable to identify the value of each of the players' wagers at each of a plurality of player positions, for each round of play. The card tracking mechanism is operable to track the values of the cards in the player hand, the cards in the dealer hand, and the community cards. The tracking system is operable to communicate the wager amounts and card values to the processor and the processor calculates an associated odds payout for each player at different points in time during a play of the game. In one example embodiment, the tracking system calculates the odds payout for each player: (a) after each of the two-card player hands have been dealt and after the two-card dealer hand is dealt; (b) after the first community card or first set of community cards have been dealt; and (c) after an additional community cards is dealt. Each of the odds payouts calculated for each of the players represents a payout based, at least in part, on the amount of the players' Play wager or odds wager, and on the probability of the player winning at that stage of the player of the game, as discussed in detail below. Accordingly, if is likely that as additional community cards are dealt and tracked by the gaming system, that the gaming system will calculate and display different payout odds to the players because the community card or cards likely affect each of the players' overall chances of winning. The gaming table includes at least one associated display device operable to display to the players and the dealer the calculated odds payout. Therefore, the gaming system of the described embodiment is capable of performing quick and accurate evaluations of wager amounts, odds of winning, and payout amounts associated with the odds of winning, and informing the players and dealer of same.

In one embodiment, the gaming system includes a table for a poker game. The gaming system includes a tracking system as discussed above. In this embodiment, the gaming table includes a plurality of display devices, the dealer position and the player positions each including at least one of said plurality of display devices. The display devices are operable to display the values of past wagers, odds payouts, and the probabilities of winning at various stages in a play of the game. Therefore, the gaming system is able to provide the players and dealer with real time information on wagering limitations through a private display interface to assist players with the wagering process. In one embodiment, the gaming system includes a common display device operable to display the information discussed above for all of the players.

In one embodiment, the wager or chip identifier operates on optical recognition. In another embodiment, the recognition technology is based on radio-frequency identification. One example of an optically based chip reading technology is described in U.S. Pat. No. 6,514,140 to Storch, which provides a gaming table for Blackjack or other card games. An individual black and white CCD sensor is mounted in a reading turret and is placed in front of each player's wagering position. In this system, each wagering chip includes patterns of repeated coding around the periphery of each player's that are identifiable by the CCD sensor. However, in the present embodiments it should be appreciated that any suitable chip identification or recognition technology may be used.

In one embodiment, the gaming system includes a tracking system including an identifier additionally operable to identify the players' cards. The scanning technologies may be optical, based on radio frequency identification or another suitable method. One example of this type of technology is described in U.S. Patent Application No. 2003/0171142 to Toshiyuki et al, which discloses a card data reader where the card data recorded on the back of the player card will be read by an internal image sensor. Another example of this technology is described in U.S. Patent Application No. 2002/0049085 to Richard et al. ("Richard"), which discloses a table monitor that automatically images the activity occurring at a gaming table. The Richard application describes an imaging system that makes a periodic comparison of captured images identifying player wagering, as well as the appearance, removal and position of cards and other game objects on the gaming table. Therefore, a card tracking system enables the casino to automatically track the cards and store the information into memory.

Additional features and advantages are described herein, and will be apparent from, the following Detailed Description and the figures.

BRIEF DESCRIPTION OF THE FIGURES

FIG. 2B is a schematic diagram of the data network that one or more of the gaming devices of the present disclosure may be connected to.

FIGS. 3A, 3B, 3C, 3D, 3E, 3F, 3G and 3H are illustrations of screen displays for a round of play of the game.

FIGS. 4A, 4B, 4C, 4D, 4E, 4F, 4G and 4H are illustrations of screen displays for another round of play of the game.

DETAILED DESCRIPTION

Figure 1A:
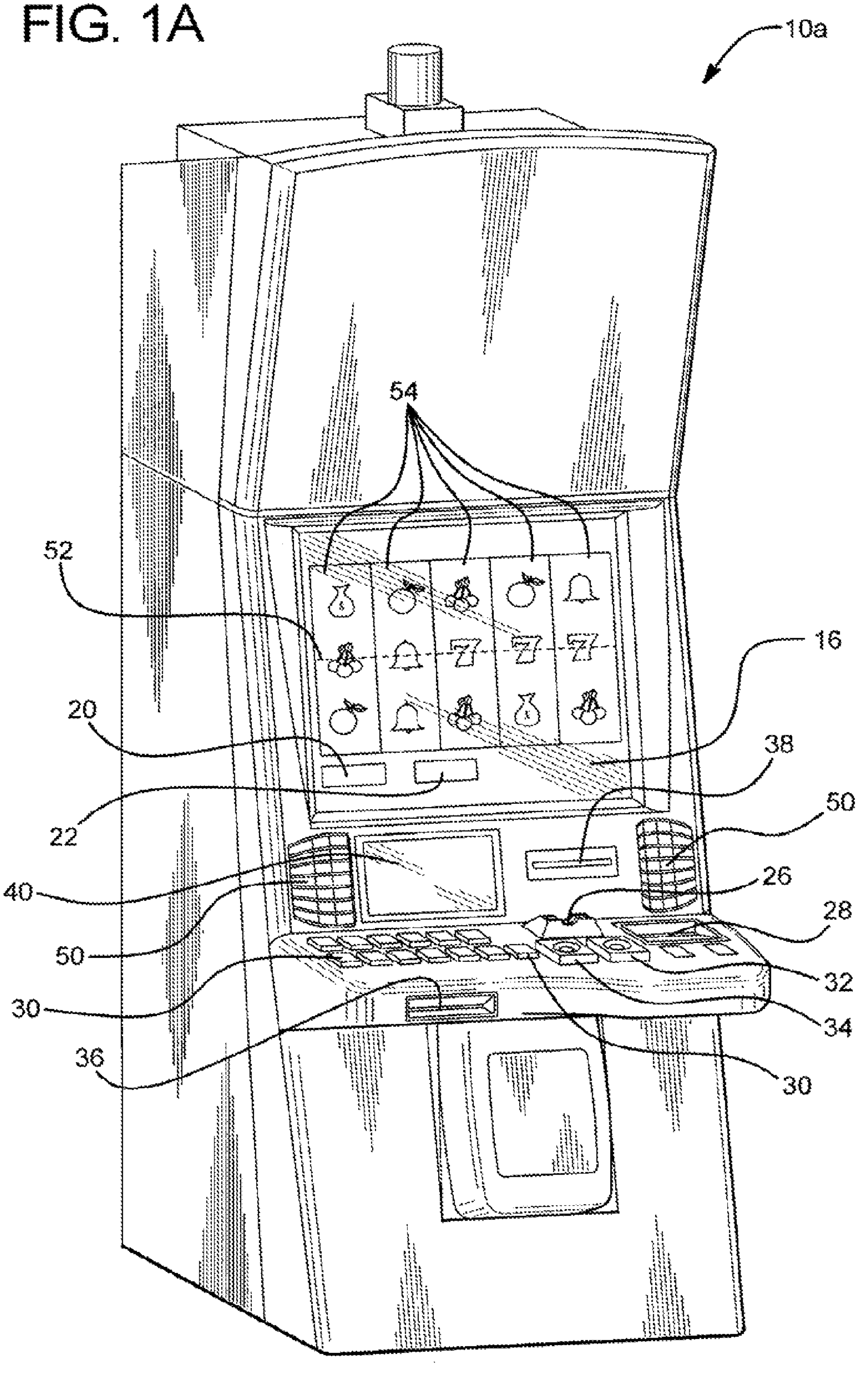
FIG. 1A is a front perspective view of one embodiment of the gaming system of the present disclosure.

The present disclosure may be implemented in various configurations for gaming machines or gaming devices, including but not limited to: (a) a casino table game, played on a physical table with physical cards dealt by a live dealer; (b)

a casino table game, played on a physical table with physical cards dealt by a live dealer, with a computer that is able to determine card values and generate signals to the dealer to direct certain dealer actions; (c) a dedicated gaming machine or gaming device, wherein the computerized instructions for controlling any games (which are provided by the gaming machine or gaming device) are provided with the gaming machine or gaming device prior to delivery to a gaming establishment; and (d) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In one embodiment, the game may be provided over a network such as the Internet. In another embodiment, the game may be provided for use on a personal digital assistant (PDA) or cellular telephone. In these embodiments, the player downloads the game to a local computing device or devices and is able to play the game in a separate location from the actual gaming establishment. In addition, in a multiplayer embodiment, several players can log on to a central server and play the game with several other players that are playing at different locations.

Figure 1B:
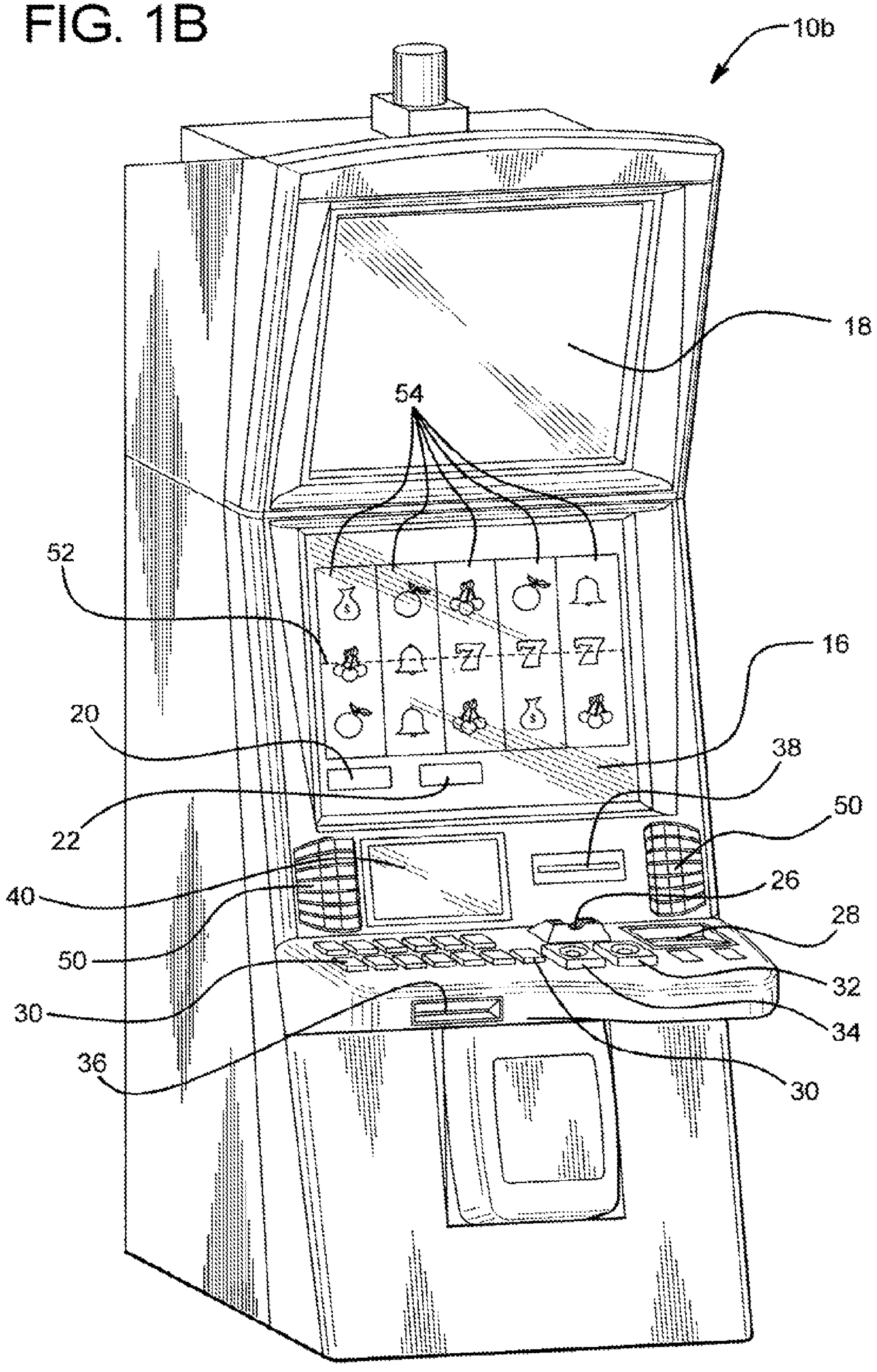
FIG. 1B is a front perspective view of one embodiment, of the gaming system of the present disclosure.

Referring now to the drawings, two example alternative embodiments of the gaming devices disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device 10 may be positioned on a base or stand or can be configured as a pub-style table-top game (not shown) which a player can operate preferably while sitting. As illustrated by the different configurations shown in FIGS. 1A and 1B, the gaming device 10 may have varying cabinet and display configurations.

Figure 2A:
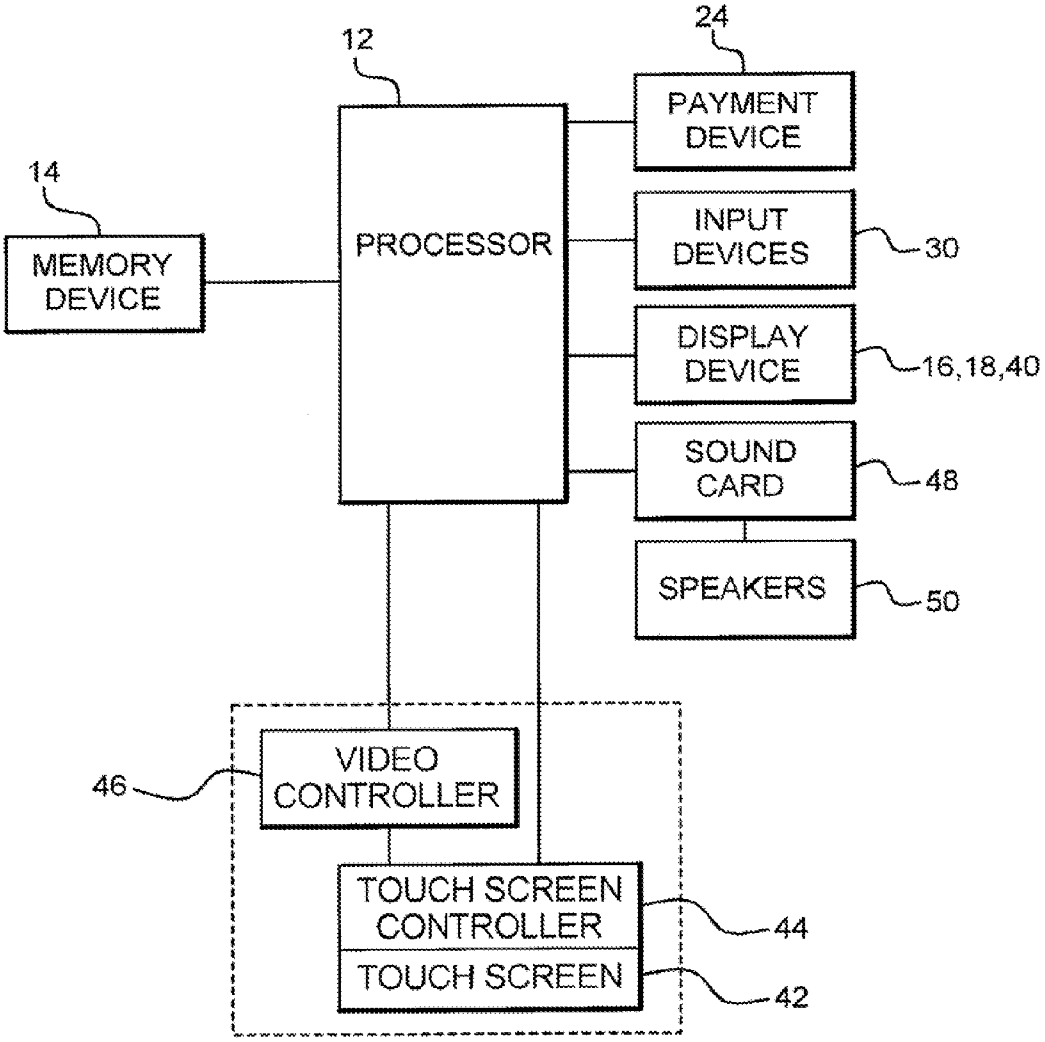
FIG. 2A is a schematic diagram of the electronic configuration of one embodiment of the gaming device of the present disclosure.

In one embodiment, as illustrated in FIG. 2A, the gaming device 10 preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device 10. The memory device stores program code and instructions, executable by the processor, to control the gaming device 10. The memory device also stores other data such as image data, event data, player input data, random or pseudo-random number generators, paytable data or information and applicable game rules that relate to the play of the gaming device 10. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device 10.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device 10 are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device 10 includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device 10. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device 10. In one embodiment, money may be transferred to a gaming device 10 through electronic funds transfer. When a player funds the gaming device 10, the processor determines the amount of funds entered and displays the corresponding amount on the credit or other suitable display as described above.

As seen in FIGS. 1A, 1B and 2A, in one embodiment the gaming device 10 includes at least one and preferably a plurality of input devices 30 in communication with the processor. The input devices can include any suitable device which enables the player to produce an input signal which is received by the processor. In one embodiment after appropriate funding of the gaming device 10, the input device is a game activation device, such as a pull arm 32 or a play button 34 which is used by the player to start any primary game or sequence of events in the gaming device 10. The play button can be any suitable play activator such as a bet one button, a max bet button or a repeat the bet button. In one embodiment, upon appropriate funding, the gaming device 10 begins the game play automatically. In another embodiment, upon the player engaging one of the play buttons, the gaming device 10 automatically activates game play.

In one embodiment, as shown in FIGS. 1A and 1B, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device 10.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin pay out tray. It should be appreciated that any suitable pay out mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device 10 by touching the touch-screen at the appropriate places. One such input device is a conventional touch-screen button panel.

The gaming device 10 may further include a plurality of communication ports for enabling communication of the processor with external peripherals, such as external video sources, expansion buses, game or other displays, an SCSI port or a key pad.

In one embodiment, as seen in FIG. 2A, the gaming device 10 includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device 10, such as an attract mode. In one embodiment, the gaming device 10 provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In one embodiment, in addition to winning credits or other awards in a base or primary game, the gaming device may also give players the opportunity to win credits in a bonus or secondary game or bonus or secondary round. The bonus or secondary game enables the player to obtain a prize or pay out in addition to the prize or pay out, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has bean unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
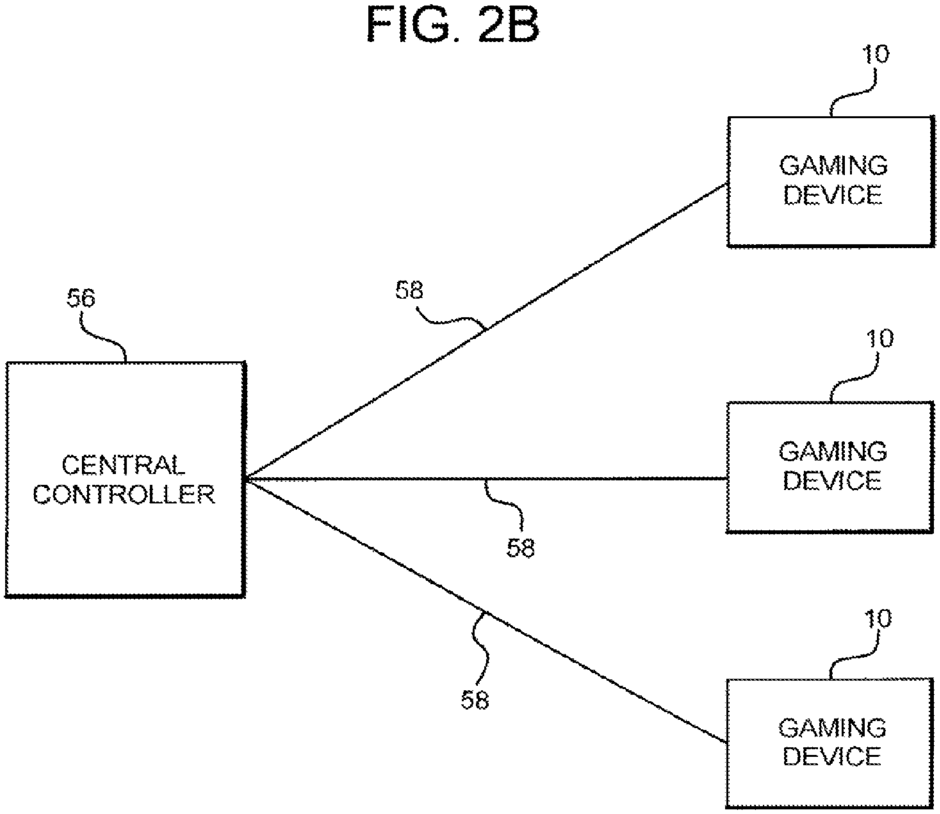

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data of signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated earning device communicates a game outcome request to the central server or controller.

In one embodiment the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked of networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable'manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometrlc technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the players first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an Internet or intranet. In this embodiment the operation of the gaming device can be viewed at the gaming device with at least one Internet browser. In this embodiment, operation of the gaming device and accumulation of credits may be accomplished with only a connection to the central server or controller (the Internet/intranet server) through a conventional phone or other data transmission line, digital subscriber line (DSL), T-1 line, coaxial cable, fiber optic cable, or other suitable connection. In this embodiment, players may access an Internet game page from any location where an Internet connection and computer, or other Internet facilitator is available. The expansion in the number of computers and number and speed of Internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment each gaming device at least includes one or more display devices and/or one or more input devices for interaction with a player. A local processor, such as the above-described gaming device processor or a processor of a focal server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, Internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is requited for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more inked gaming devises.

One or more embodiments of the present disclosure comprise a gaming system including a live table game and an activity tracking and reward system. The tracking system is configured to collect and store raw data relating to the wagering activities of players at a gaming table. The present disclosure also includes methods of utilizing the obtained data. For example, the data may be used to calculate the house rake, where the house rake may be based on the size of the pot at the end of a hand. In one embodiment, certain criteria are applied to the obtained data to determine if a player qualifies to receive a progressive jackpot award. In another embodiment, the collected data is analyzed to determine a player's wagering history to determine whether or not the player is entitled to certain complimentary items. In another embodiment, the gaming system notifies a player that a seat is vacant at a poker table, where the player is located at a remote gaming device or gaming table.

Primary Embodiment of Poker Game

As shown in FIG. 3A, in an embodiment, the gaming device 10 incorporates a Texas Hold'em style poker game where the gaming device 10 initially deals each participating player two cards face-up to form three two-card player hands 20*a*, 20*b* and 20*c*. The cards are dealt from a virtual deck of fifty-two playing cards. The gaming device 10 also deals two cards face-up to form an initial dealer hand 22. All of the cards are dealt in a play area 24. In this embodiment, the play area 24 visually represents or emulates a virtual poker table with the dealer 32 positioned at the rear of the table and the players 26, 28 and 30 positioned about the remainder of the table. However, it should be appreciated that the number of players may be greater than or less than three, and the players and dealer may be positioned on the display device or virtual poker table in any suitable configuration. The gaming device 10 display includes a summary display 50, a message display 42, an ante input 44, and wager input 48, and a check input 48. It should be appreciated that in other embodiments, different inputs and display area may be provided. It should also be appreciated that rather than dealing the initial dealer hand 22 with both cards face-up, one card or both cards may be initially dealt face-down.

The gaming device 10 prompts or requires each of the players 26, 28 and 30 to place an ante wager. In this example play of the game, the amount of the ante is fifty credits. In this embodiment, the play area 24 includes a wager area 34 for player one 26, a wager area 30 for player two 28, and a wager area 38 for player three 30. In one embodiment, each player position includes a display device that displays the odds of winning and potential pay outs in real time. However, it should be appreciated that in other embodiments, the wager areas are omitted and the wager amounts are simply kept track of and displayed in the summary display 50.

FIG. 3A shows the beginning of a first round of play of the poker game after each of the players has placed the ante wager. As indicated in the summary display 50, the total wager for player one 26 is fifty, the total wager for player two 28 is fifty, and the total wager for player three 30 is fifty. The gaming device 10 deals two cards to each of the players and to the dealer 22 to form the initial two card hands. Player one's initial hand 20*a* is A♥K♦, player two's initial hand 20*b* is 2♠3♣, and player three's initial hand 20*c* is 7♥7♠. The dealer's initial hand is J♣J♥. Therefore, both player one 30 and the dealer 32 have a pair for their initial hands. The gaming device 10 determines the odds of winning for each of the player hands, where the odds of winning represent the probability that a player's hand will eventually outrank the dealer'hand after the three community cards are ultimately dealt. For player one 26, the odds of winning at this stage of the play of the game are 43%, as indicated in the message display 42 and the summary display 50. Also, player two's 28 odds of winning are 14% and player three's 30 odds of winning are 19%.

At this point, the gaming device 10 prompts each of the players to place an optional wager based on the players' respective starting hands. In this embodiment, the pay outs associated with this wager are based on the probability or odds of the player's hand beating the dealer's hand. The higher the odds of winning, the lower the associated pay out. Conversely, the lower the odds of winning, the higher the associated pay out. As such, even if a player has a relatively low chance of winning, a wager may be worthwhile because of the high pay out. Therefore, assuming all of the players place identical wagers, the player with the lowest likelihood of winning (i.e., player 2) will have the highest associated pay out. In this example round of wagering, as shown in FIG. 3A, player one's 28 odds of winning are 43% and the associated pay out is 5:6, player two's 28 odds of winning are 14% and the associated pay out is 6:1, and player three's 30 odds of winning are 18% and the associated pay out is 5:1, as also indicated in the summary display 50. The gaming device 10 prompts player one 26 to place a wager, as indicated in the message display 42. In this round of wagering, player one 26 elects to place a wager, as indicated by the activated wager input 46.

Figure 3B:
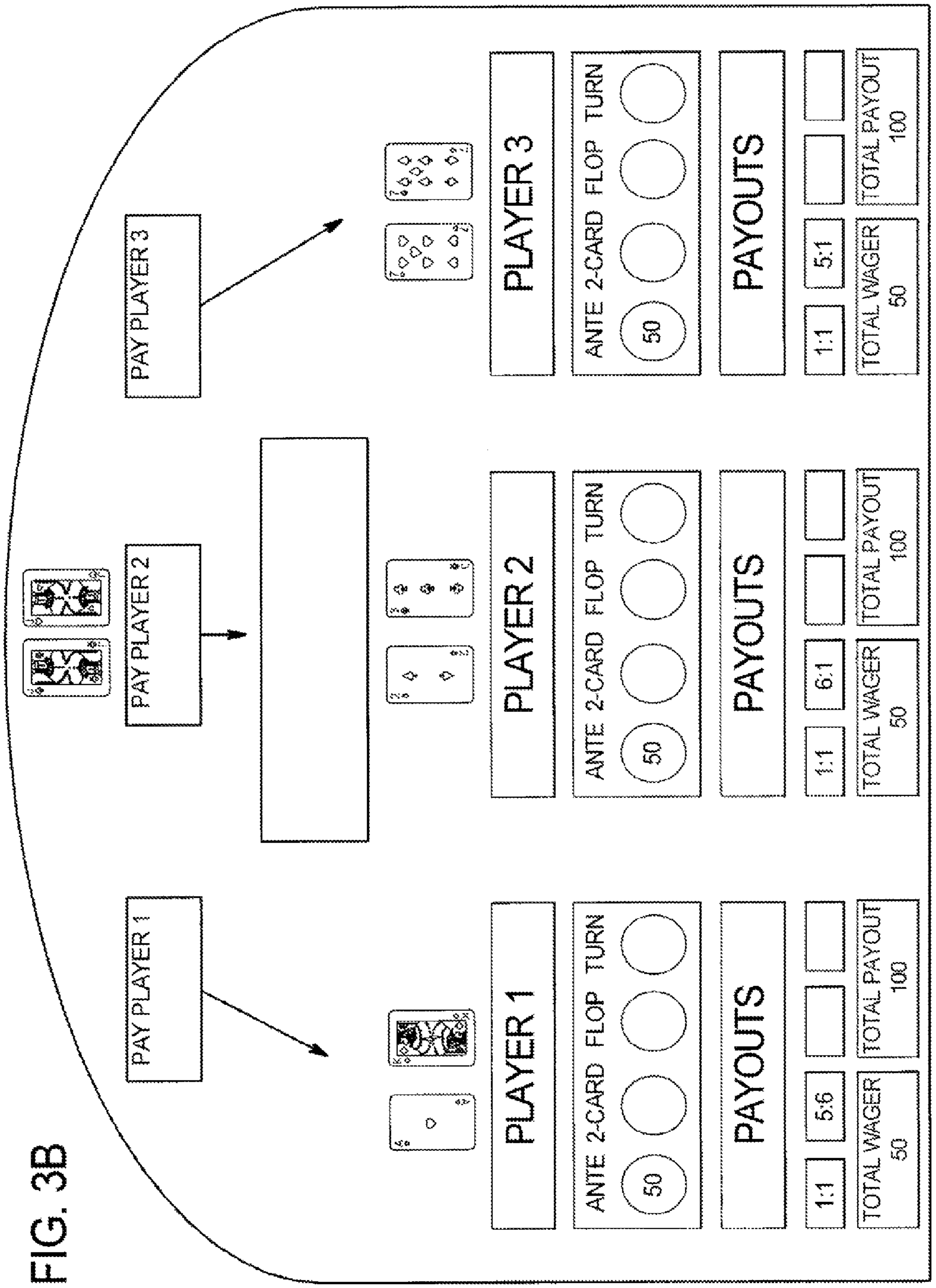

FIG. 3B shows an embodiment of the gaming device where the game is played at a computerized gaming table with individual displays for player one, player two, and player three. In this embodiment, the cards are virtual cards and the wagers placed appear as credits on the display. Each of the player displays include an area where the virtual cards are displayed, multiple wagering areas (i.e., an ante wagering area, a two-card wagering area, a flop card wagering area, and a turn card wagering area), multiple pay out areas, a total wager display area, and a total pay out display area. The multiple pay out areas include a first area that indicates the pay out associated with the ante, a second area that indicates the pay out associated with the initial two-card hand, a third area that indicates the pay out associated with the flop card, and a fourth area that indicates the pay out associated with the turn card. The gaming table area also includes a display area where the community cards are displayed, a dealer card area, and pay player displays for each of the three players. It should be appreciated that in another embodiment, the gaming device is played at a gaming table with a live dealer, physical cards and physical wagering chips. It should also be appreciated that in another embodiment, the gaming device is played at a gaming table with a live dealer, virtual cards and physical wagering chips FIG. 3B shows the state of the play of the game that is shown in FIG. 3A.

As shown in FIG. 3C, player one 26 has chosen to place a wager of twelve credits based on the initially dealt cards 20*a*. Now, player one's 26 total wager is sixty-two (i.e. fifty credit ante wager and twelve credit wager on initial cards). Based on the associated pay out of 5:6 and the wager of twelve credits, player one's 26 associated pay out is twenty-two credits, as indicated in the summary display 50. The associated pay out of twenty-two credits includes the wager of twelve credits and the award often credits (i.e., 5:6 pay out applied to the twelve credit wager). Player two 28 has chosen to place a wager of twenty credits based on the initially dealt cards 20*b*. Based on the associated pay out of 6:1 and the wager of twenty credits, player two's 28 associated pay out is one-hundred forty credits, as indicated in the summary display 50. The associated pay out of one-hundred credits includes the wager of twenty credits and the award of one-hundred twenty credits (i.e., 6:1 pay out applied to the twenty credit wager). Player three 30 has chosen to place a wager of ten credits based on the initially dealt cards 20*c*. Based on the associated pay out of 5:1 and the wager of ten credits, player three's 28 associated pay out is sixty credits, as indicated in the summary display 50. The associated pay out of sixty credits includes the wager of ten credits and the award of fifty credits (i.e., 5:1 pay out applied to the ten credit wager). Therefore, even though player two 28 has the lowest probability of beating the dealer hand 22, player two's 28 potential pay out is the largest of the three players. Also, even though player one 26 has the highest probability of beating the dealer hand 22, player one's 26 potential pay out is the lowest of the three players. Accordingly, despite the rank or value of each of the players' initially dealt two card hands, each player has a substantially similar long term award pay out expectation. Therefore, regardless of whether a player is a relatively skilled or relatively unskilled poker player, the player does not have an advantage or disadvantage relative to the other players at the table. Also, because the players are all playing against the dealer rather than against each other, the gaming device is able to display all of the player cards to all of the players without causing an advantage or disadvantage to any of the other players. For example, if a first player gains knowledge by viewing the remaining player cards that the first player has a better chance of beating the dealer hand, the associated pay out for the first player goes down accordingly. Therefore, the players do not garner an advantage by viewing any face-up cards of the other players.

In one embodiment, if a player chooses not to place a wager based on the initial two-card hand, they are still eligible to place wagers on the subsequent cards. In another embodiment, if a player opts to forego placing at least a designated minimum wager on the two-card hand, they are prevented from placing additional wagers.

As shown in FIG. 3C, the gaming device 10 deals the flop card 52 in the community play area 40, as indicated also in the message display 42. The flop card 52 is the A♣ and is a community card that is used in each of the three player hands. It should be appreciated that in other embodiments, the flop deal may include three cards instead of one, as in traditional Texas Hold'em games. At this point, the players and the dealer each have a three card hand consisting of their respective initially dealt two card hands and the first community card or flop card 52. Player one's hand 20*a* includes A♥A♣K♦, which includes a single pair of Aces. Player two's hand 20*b* includes A♣3♣2♠, with a A♣ as the high card. Player three's hand 20*c* includes 7♥7♠A♣, which includes a single pair of sevens. The dealer hand 22 is J♣J♥A♣, which includes a pair of Jacks.

The gaming device 10 once again determines the odds of winning for each of the player hands based on the three cards hands. In this example round of wagering, as shown in FIG. 3C, player one's 26 odds of winning have increased to 80% and the associated pay out is 2:3, player two's 28 odds of winning have decreased slightly to 13% and the associated pay out is 6:1, and player three's 30 odds of winning have decreased slightly to 15% and the associated pay out is 6:1, as also indicated in the summary display 50. The gaming device 10 prompts player one 26 to place a wager, as indicated in the message display 42. In this round of wagering, player one 26 elects to place a wager based on the three card hand which includes the community flop card 52, as indicated by the activated wager input 46.

Figure 3D:
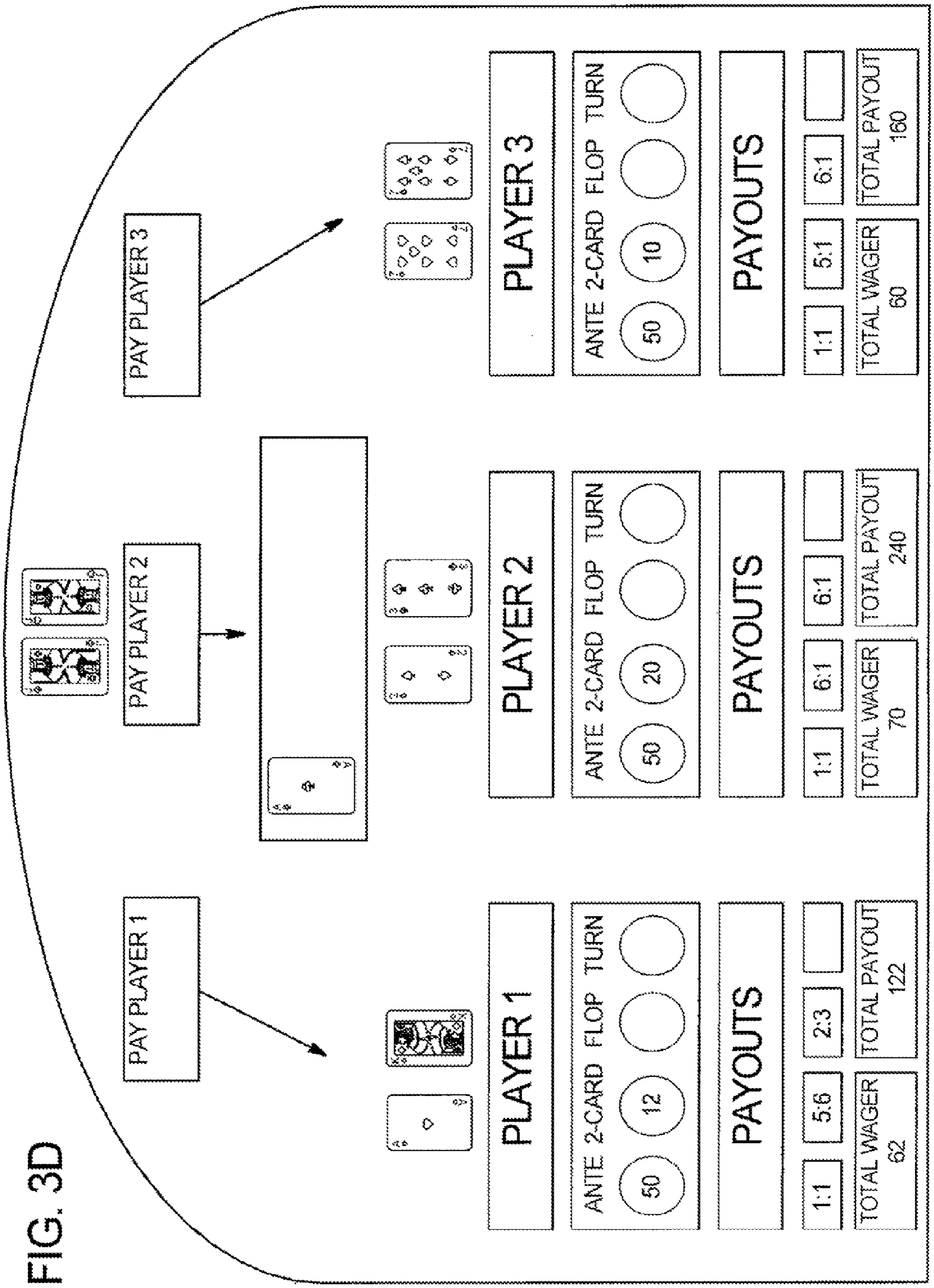

FIG. 3D shows the state of the play of the game that is shown in FIG. 3C, and corresponds to the embodiments described above with respect to FIG. 3A.

As shown in FIG. 3E, player one 26 has chosen to place a wager of twenty-four credits based on the initially dealt cards 20*a* and the flop card 52. Now, player one's 26 total wager is eighty-six (i.e., fifty credit ante wager, twelve credit wager on initial cards, and twenty-four credit wager on the flop card). Based on the associated pay out of 2:3 and the wager of twenty-four credits, player one's 26 associated pay out is forty credits, as indicated in the summary display 50. The associated pay out of forty credits includes the wager of twenty-four credits and the award of sixteen credits (i.e., 2:3 pay out applied to the twenty-four credit wager). Player two 28 has chosen lo place a wager of five credits based on the initially dealt cards 20*b* and the flop card 52. Based on the associated pay out of 6:1 and the wager of five credits, player two's 28 associated pay out is thirty-five credits, as indicated in the summary display 50. The associated pay out of thirty-five credits includes the wager of five credits and the award of thirty credits (i.e., 6:1 pay out applied to the five credit wager). Player three 30 has chosen to place a wager of twenty credits based on the initially dealt cards 20*c* and the flop card 52. Based on the associated pay out of 6:1 and the wager of twenty credits, player three's 28 associated pay out is one-hundred forty credits, as indicated in the summary display 50. The associated pay out of one-hundred forty credits includes the wager of twenty credits and the award of one-hundred twenty credits (i.e., 6:1 pay out applied to the twenty credit wager).

As shown in FIG. 3E, the gaming device 10 deals the turn card 54 in the community play area 40, as indicated also in the message display 42. The turn card 54 is the 9♠ and is also a community card that is used in each of the three player hands and the dealer hand 22. At this point, the players and the dealer each have a four card hand consisting of their respective initially dealt two card hands, the first community card or flop card 52, and the second community card or turn card 54. Player one's hand 20*a* includes A♥A♣K♦9♠, which includes a single pair of Aces. Player two's hand 20*b* includes A♣9♠3♣2♠, with a A♣ as the high card Player three's hand 20*c* includes 7♥7♠A♣9♠, which includes a single pair of sevens. The dealer hand 22 is J♣J♥A♣9♠, which includes a pair of Jacks.

The gaming device 10 once again determines the odds of winning for each of the player hands based on the four cards hands. In this example round of wagering, as shown in FIG. 3E, player one's 26 odds of winning have increased to 85% end the associated pay out is 1:3, player two's 28 odds of winning have remained roughly the same at 13% and the associated pay out is 13:2, and player three's 30 odds of winning have remained roughly the same al 15% and the associated pay out remains at 6:1, as also indicated in the summary display 50. The gaming device 10 prompts player one 26 to place a wager, as indicated in the message display 42. In this round of wagering, player one 26 elects to place a wager based on the four card hand which includes the community flop card 52 and the turn card 54, as indicated by the activated wager input 46.

As shown in FIG. 3G, player one 26 has chosen to place a wager of twenty-four credits based on the initially dealt cards 20*a*, the flop card 52, and the turn card 54. Now, player one's 26 total wager is one-hundred ten (i.e., fifty credit ante wager, twelve credit wager on initial cards, twenty-four credit wager on the flop card, and twenty-four credit wager on the turn card). Based on the associated pay out of 1:3 and the wager of twenty-four credits, player one's 26 associated pay out is thirty-two credits, as indicated in the summary display 50. The associated pay out of thirty-two credits includes the wager of twenty-four credits and the award of eight credits (i.e., 1:3 pay out applied to the twenty-four credit wager). Player two 28 has chosen to place a wager of five credits based on the initially dealt cards 20*b*, the flop card 52, and the turn card 54. Based on the associated pay out of 13:2 and the wager of five credits, player two's 28 associated pay out is thirty-seven credits, as indicated in the summary display 50. The associated pay out of thirty-seven credits includes the wager of five credits and the award of thirty-two credits (i.e., 13:2 pay out applied to the five credit wager). Player three 30 has chosen to place a wager of ten credits based on the initially dealt cards 20*c*, the flop card 52, and the turn card 54. Based on the associated pay out of 6:1 and the wager of ten credits, player three's 28 associated pay out is seventy credits, as indicated in the summary display 50. The associated pay out of seventy credits includes the wager often credits and the award of sixty credits (i.e., 6:1 pay out applied to the twenty credit wager).

Figure 3F:
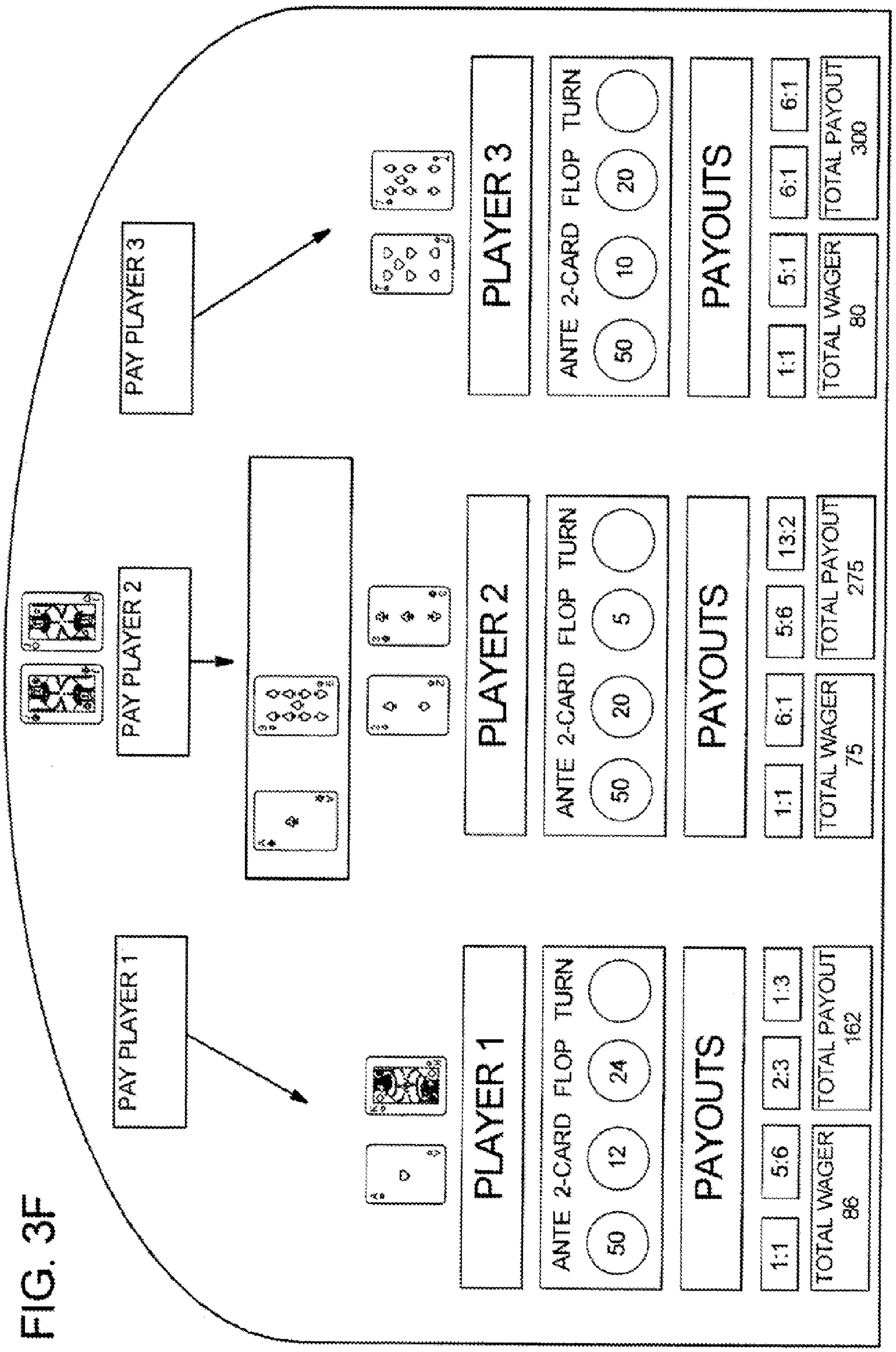

FIG. 3F shows the state of the play of the game that is shown in FIG. 3D, and corresponds to the embodiments described above with respect to FIG. 3A.

As shown in FIG. 3G, the gaming device 10 deals the river card 56 in the community play area 40, as indicated also in the message display 42. The river card 56 is the 7♦ and is also a community card that is used in each of the three player hands and the dealer hand 22. At this point, the players and the dealer each have a complete five card hand consisting of their respective initially dealt two card hands, the first community card or flop card 52, the second community card or turn card 54, and the third community card or river card 56. Player one's hand 20*a* is A♥A♣ K♦9♠ 7♦, which includes a single pair of Aces. Player two's hand 20*b* includes A♣ 9♠7♦3♣2 ♠, with a A♣ as the high card. Player three's hand 20*c* includes 7♥7♠7♦A♣9♠, which includes a Three-Of-A-Kind of sevens. The dealer hand 22 is J♣ J♥A♣ 9♠ 7♦, which includes a pair of Jacks.

As shown in FIG. 3G, the gaming device 10 determines the final hands and displays them to the players in the summary display 50. The gaming device also determines whether the respective player hands have a higher rank than the rank of the dealer hand 22. In this example round of play of the game, player one's hand 20*a* and player three's hand 20*c* outrank the dealer hand 22. With regard to player one's hand 20*a*, a pair of Aces is a higher rank than the dealers 32 pair of Jacks. With regard to player three's hand 20*c*, the Three-Of-A Kind of sevens is a higher rank than the dealer's 32 pair of Jacks. However, because the rank of player two's hand 20*b* (i.e., Ace high) ranks lower than the dealer's hand 22, player two 28 forfeits the ante wager and each of the three additional wagers.

The gaming device 10 also determines the total award for player one 26 and player two 30. Player one's 26 total award is one-hundred ninety four credits, as indicated in the message display 42 and the summary display 50. Player one's award of one-hundred ninety credits includes: (a) one-hundred credits based on the ante wager; (b) twenty-two credits based on the initial cards wager; (c) forty credits based on the flop card wager; and (d) thirty-two credits based on the turn card wager. Player three's 30 total award is three-hundred seventy credits, as indicated in the message display 42 and the summary display 50. Player three's award of one-hundred ninety credits includes: (a) one-hundred credits based on the ante wager; (b) twenty-two credits based on the initial cards wager; (c) forty credits based on the flop card wager; and (d) thirty-two credits based on the turn card wager.

Figure 3H:
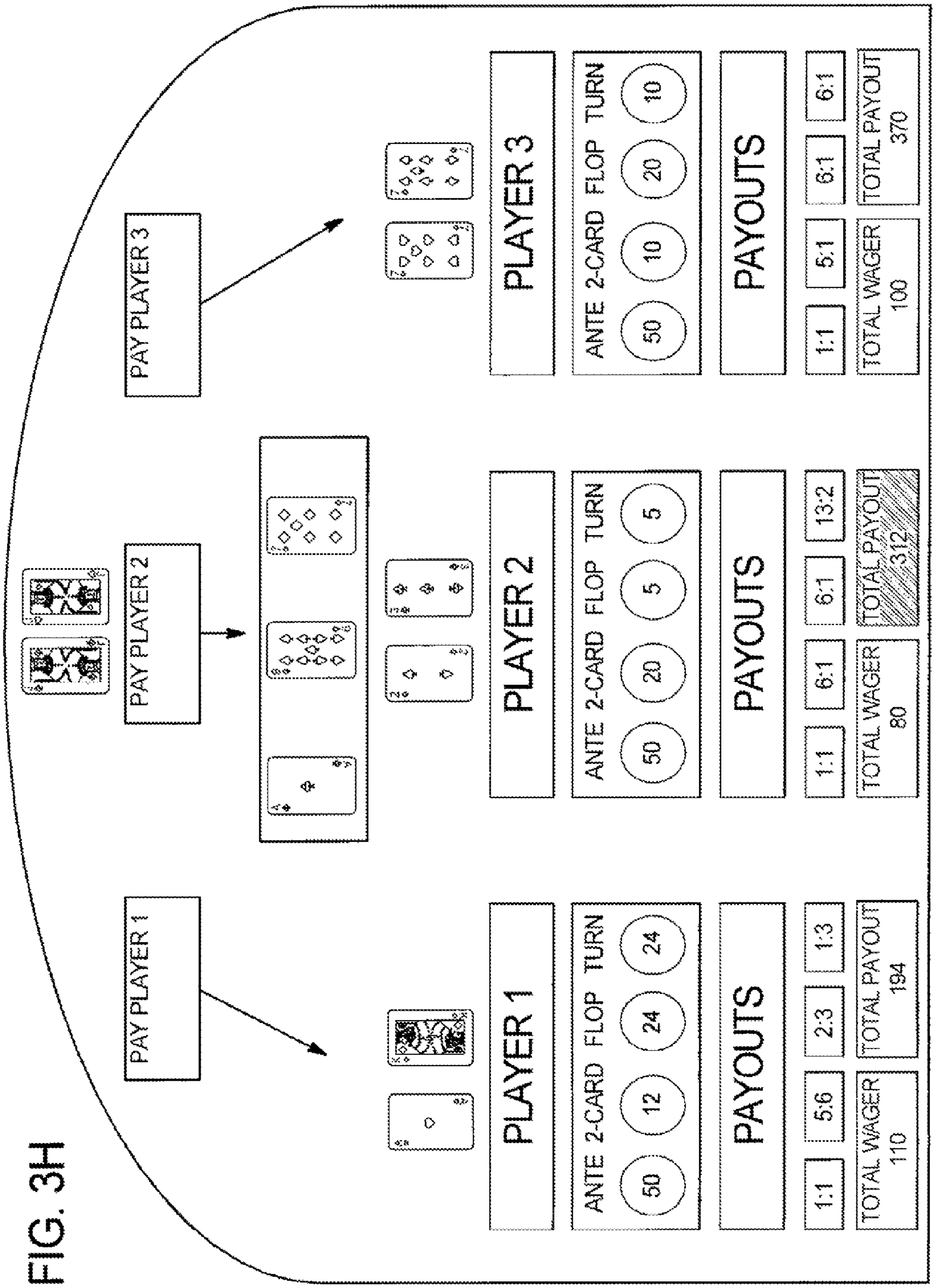

FIG. 3H shows the state of the play of the game that is shown in FIG. 3E, and corresponds to the embodiments described above with respect to FIG. 3A.

As shown in FIGS. 4A-4H, an example play of the game is described where a player wins a large award based on a very low initial probability of winning, and where another different player is prevented from placing additional wagers where the player is already guaranteed to beat the dealer. At the start of a round of play of the game, the gaming device 110 prompts or requires each of the players 126, 128 and 130 to place an ante wager. In this example play of the game, the amount of the ante is fifty credits.

FIG. 4A shows the beginning of a first round of play of the poker game after each of the players has placed the ante wager. As indicated in the summary display 150, the total wager for player one 126 is fifty, the total wager for player two 128 is fifty, and the total wager for player three 130 is fifty. The gaming device 110 deals two cards to each of the players and to the dealer 122 to form the initial two card hands. Player one's initial hand 120*a* is J♠K♠, player two's initial hand 120*b* is 3♥7♦, and player three's initial hand 120*c* is A♥A♠. The dealer's initial hand 122 is K♦J♣. Because both player one 126 and the dealer 132 have a Jack and a King for their initial hands, it is highly likely that player one 126 and the dealer 132 will end up with hands of the same rank. In this example, the only way for player one 126 to beat the dealer hand 122 is for player one 126 to draw three Spades to form a flush. Accordingly, the odds of player one 126 beating the dealer are very low.

The gaming device 110 determines the odds of winning for each of the player hands, where the odds of winning represent the probability that a player's hand will eventually outrank the dealer's hand after the three community cards are ultimately dealt. For player one 126, the odds of winning at this stage of the play of the game are roughly 2%, as indicated in the message display 142 and the summary display 150. Also, player two's 128 odds of winning are 31% and player three's 130 odds of winning are 83%.

At this point the gaming device 110 prompts each of the players to place an optional wager based on the players' respective starting hands. In this embodiment, the pay outs associated with this wager are based on the probability or odds of the player's hand beating the dealer's hand. As mentioned above, the higher the odds of winning, the lower the associated pay out, and the lower the odds of winning, the higher the associated pay out. As such, even if a player has a relatively low chance of winning, a wager may be worthwhile because of the high pay out. In this example round of wagering, as shown in FIG. 4A, player one's 126 odds of winning are very low at 2%, but the associated pay out is 45:1, which is very high. Therefore, even though player one 126 has a very low chance of drawing three Spades to form a flush and beat the dealer hand 122, the potentially high associated pay out for player one 126 may make a wager worthwhile. Player two's 128 odds of winning are 31% and the associated pay out is 3:1, and player three's 130 odds of winning are 83% and the associated pay out is 1:4, as also indicated in the summary display 150. Because player three's 130 initial hand 120*c* of A♥A♠ is a very high ranking hand which is likely to beat the resulting dealer hand 122, player three's 130 associated pay out is low at 1:4. The gaming device 110 prompts player one 120 to place a wager, as indicated in the message display 142. In this round of wagering, player one 126 elects to place a wager, as indicated by the activated wager input 146.

Figure 4B:
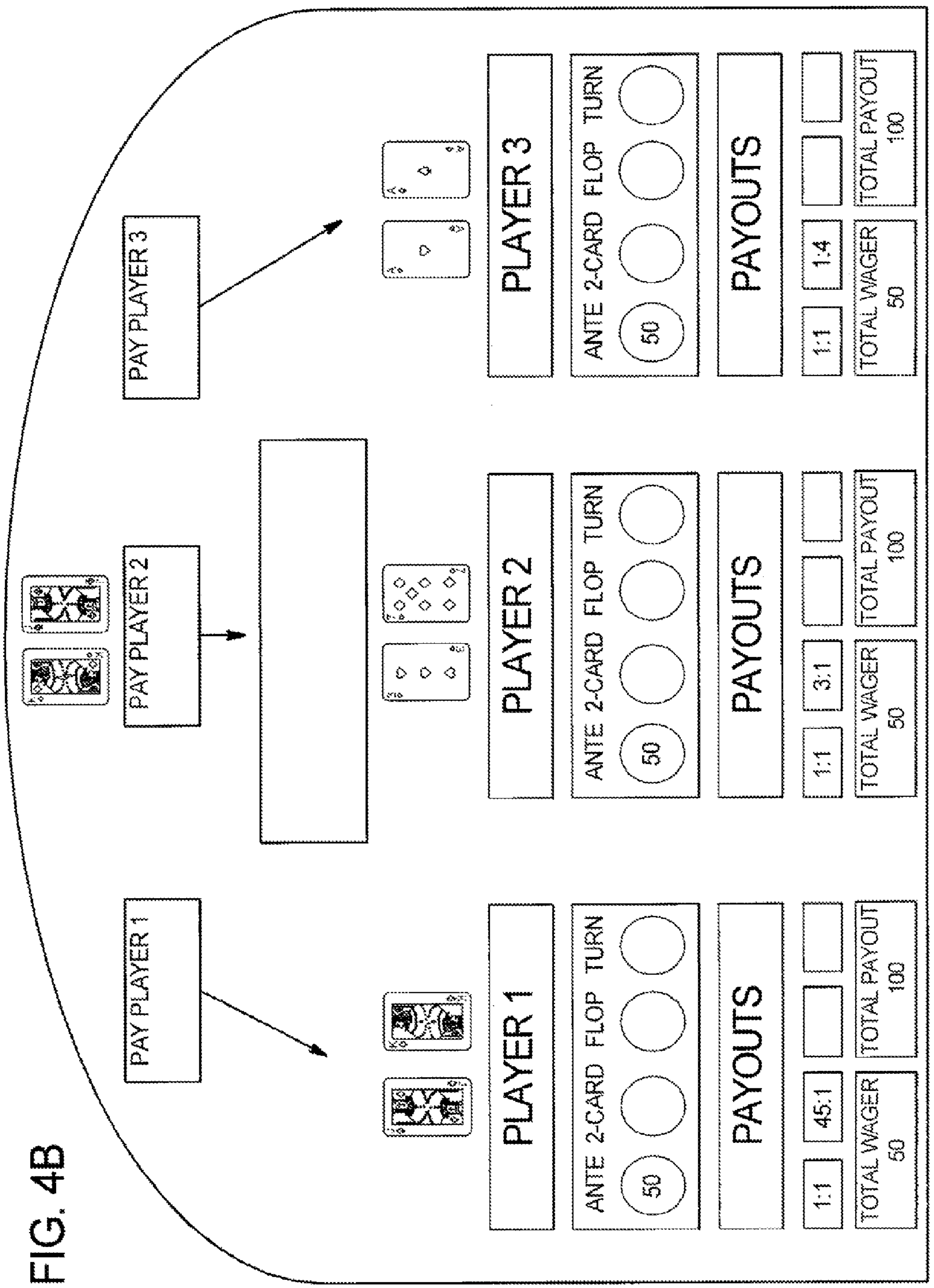

FIG. 4B shows the state of the play of the game that is shown in FIG. 4A, and corresponds to the embodiments described above with respect to FIG. 3A.

As shown in FIG. 4C, player one 126 has chosen to place a wager of ten credits based on the initially dealt cards 120*a*. Now, player one's 126 total wager is sixty (i.e., fifty credit ante wager and ten credit wager on initial cards). Based on the associated pay out of 45:1 and the wager of ten credits, player one's 126 associated pay out is four-hundred sixty credits, as indicated in the summary display 150. The associated pay out of four-hundred sixty credits includes the wager of ten credits and the award of four-hundred fifty credits (i.e., 45:1 pay out applied to the ten credit wager). Accordingly, player one 126 has a very high potential award based on a relatively small wager. Player two 128 has chosen to place a wager of forty credits based on the initially dealt cards 120*b*. Based on the associated pay out of 3:1 and the wager of forty credits, player two's 128 associated pay out is one-hundred sixty credits, as indicated in the summary display 150. The associated pay out of one-hundred sixty credits includes the wager of forty credits and the award of one-hundred twenty credits (i.e., 3:1 pay out applied to the forty credit wager). Player three 130 has chosen to place a wager of two-hundred credits based on the initially dealt cards 120*c*. Based on the associated pay out of 1:4 and the wager of two-hundred credits, player three's 128 associated pay out is two-hundred fifty credits, as indicated in the summary display 150. The associated pay out of two-hundred fifty credits includes the wager of two-hundred credits and the award of fifty credits (i.e., 1:4 pay out applied to the two-hundred credit wager). Therefore, even though player three 130 has the highest probability of beating the dealer hand 122 and has placed by far the highest wager, player three's 130 potential pay out is still less than player one's 126 potential associated pay out of four-hundred sixty credits. As mentioned above, despite the rank or value of each of the players' initially dealt two card hands and the respective probability of beating the dealer hand 122, each player has a substantially similar long term award pay out expectation. That is, although player one 126 has a very high potential associated pay out, the probability that player one 126 will beat the dealer hand 122 is very low.

As shown in FIG. 4C, the gaming device 110 deals the flop card 152 in the community play area 140, as indicated also in the message display 142. The flop card 152 is the 2♠ and is a community card that is used in each of the three player hands, as described above. At this point, the players and the dealer each have a three card hand consisting of their respective initially dealt two card hands and the first community card or flop card 152. Player one's hand 120*a* includes K♠J♠2♠. Although player one 126 did not form a pair, player one 126 still has a potential Spade flush, as thus is not prohibited from further wagering. That is, if the flop card 152 would have been any card other than a Space, it would be impossible for player one 126 to beat the dealer hand 122, and player one 126 would have lost the ante and wager. Player two's hand 120*b* includes 7♦3♥2♠, with a 7♦ as the high card. Player three's hand 120*c* includes A♥A♠2♠, which includes a single pair of Aces. The dealer hand 22 is K♦J♣2♠, which includes a King high.

The gaming device 110 once again determines the odds of winning for each of the player hands based on the three cards hands. In this example round of wagering, as shown in FIG. 4C, player one's 126 odds of winning have increased slightly to 8% and the associated pay out has decreased to 15:1, player two's 128 odds of winning have decreased to 22% and the associated pay out has increased to 4:1, and player three's 130 odds of winning have increased to 87% and the associated pay out has decreased to 5:1, as also indicated in the summary display 150. At this stage, the only way that player three's 130 could lose to the dealer hand 122, is if the turn cards 154 and river card 156 were K♥K♣, J♥J♦, K♥J♥, K♥J♦, K♦J♥ or K♦J♦. Therefore, it is very likely that player three's 130 resulting hand will beat the resulting dealer hand 122. Accordingly, player three's 130 associated pay out is low.

The gaming device 110 prompts player one 126 to place a wager, as indicated in the message display 142. In this round of wagering, player one 126 elects to place a wager based on the three card hand which includes the community flop card 152, as indicated by the activated wager input 146.

Figure 4D:
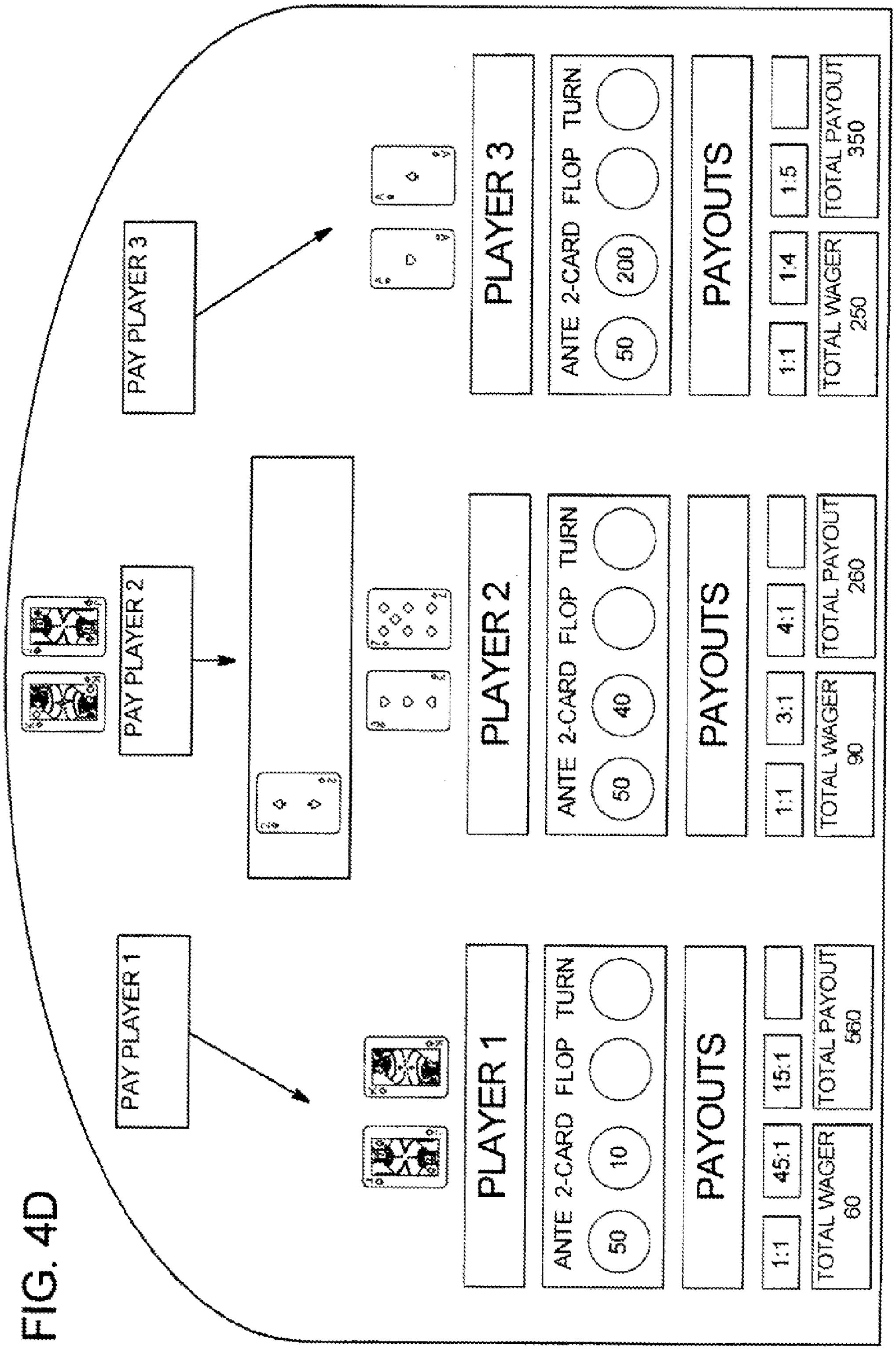

FIG. 4D shows the state of the play of the game that is shown in FIG. 4C, and corresponds to the embodiments described above with respect to FIG. 3A.

As shown in FIG. 4E, player one 126 has chosen to place a wager of ten credits based on the initially dealt cards 120*a* and the flop card 152. Now, player one's 126 total wager is seventy (i.e., fifty credit ante wager, a ten credit wager on the initial cards, and a ten credit wager on the flop card). Based on the associated pay out of 4:1 and the wager often credits, player one's 126 associated pay out for the flop card wager is one-hundred sixty credits, as indicated in the summery display 150. The associated pay out of one-hundred sixty credits includes the wager of ten credits and the award of one-hundred fifty credits (i.e., 15:1 pay out applied to the ten credit wager on the flop card). Player two 128 has chosen to place a wager of ten credits based on the initially dealt cards 120*b* and the flop card 152. Based on the associated pay out of 4:1 and the wager of ten credits, player two's 128 associated pay out is fifty credits, as indicated in the summary display 150. The associated pay out of fifty credits includes the wager of ten credits and the award of forty credits (i.e., 4:1 pay out applied to the ten credit wager). Player three 130 has chosen to place a wager of twenty credits based on the initially dealt cards 120*c* and the flop card 152. Based on the associated pay out of 1:5 and the wager of twenty credits, player three's 128 associated pay out is twenty four credits, as indicated in the summary display 150. The associated pay out of twenty four credits includes the wager of twenty credits and the award of four credits (i.e., 1:5 pay out applied to the twenty credit wager).

As shown in FIG. 4E, the gaming device 110 deals the turn card 154 in the community play area 140, as indicated also in the message display 142. The turn card 154 is the 9♠ and is also a community card that is used in each of the three player hands and the dealer hand 122. At this point, the players and the dealer each have a four card hand consisting of their respective initially dealt two card hands, the first community card or flop card 152, and the second community card or turn card 154. Player one's hand 120*a* includes K♠J♠9♠2♠, which includes four of the five Spades needed to form a flush. Player two's hand 120*b* includes 9♠7♦3♥2♠, with a nine as the high card. Player three's hand 120*c* includes A♥A♠9♠2♠, which includes a single pair of Aces. The dealer hand 22 is K♦J♣9♠2♠, which includes a King high.

The gaming device 110 once again determines the odds of winning for each of the player hands based on the four cards hands. In this example round of wagering, as shown in FIG. 4E, player one's 126 odds of winning have increased to 20% and the associated pay out decreases to 4:1, player two's 128 odds of winning have decreased to 11% and the associated pay out has increased to 8:1, and player three's 130 odds of winning have increased to 100% and there is no associated pay out, as also indicated in the summary display 50. That is, at this point in the play of the game, there is no river card 156 that would cause player three 130 to lose to the dealer hand. Accordingly, because player three 130 is guaranteed to win, the gaming device 110 does not allow player three 130 to place another wager.

As shown in FIG. 4E, the gaming device 110 prompts player one 126 to place a wager, as indicated in the message display 142. In this round of wagering, player one 126 elects to place a wager based on the four card hand which includes the community flop card 152 end the turn card 154, as indicated by the activated wager input 146.

Figure 4F:
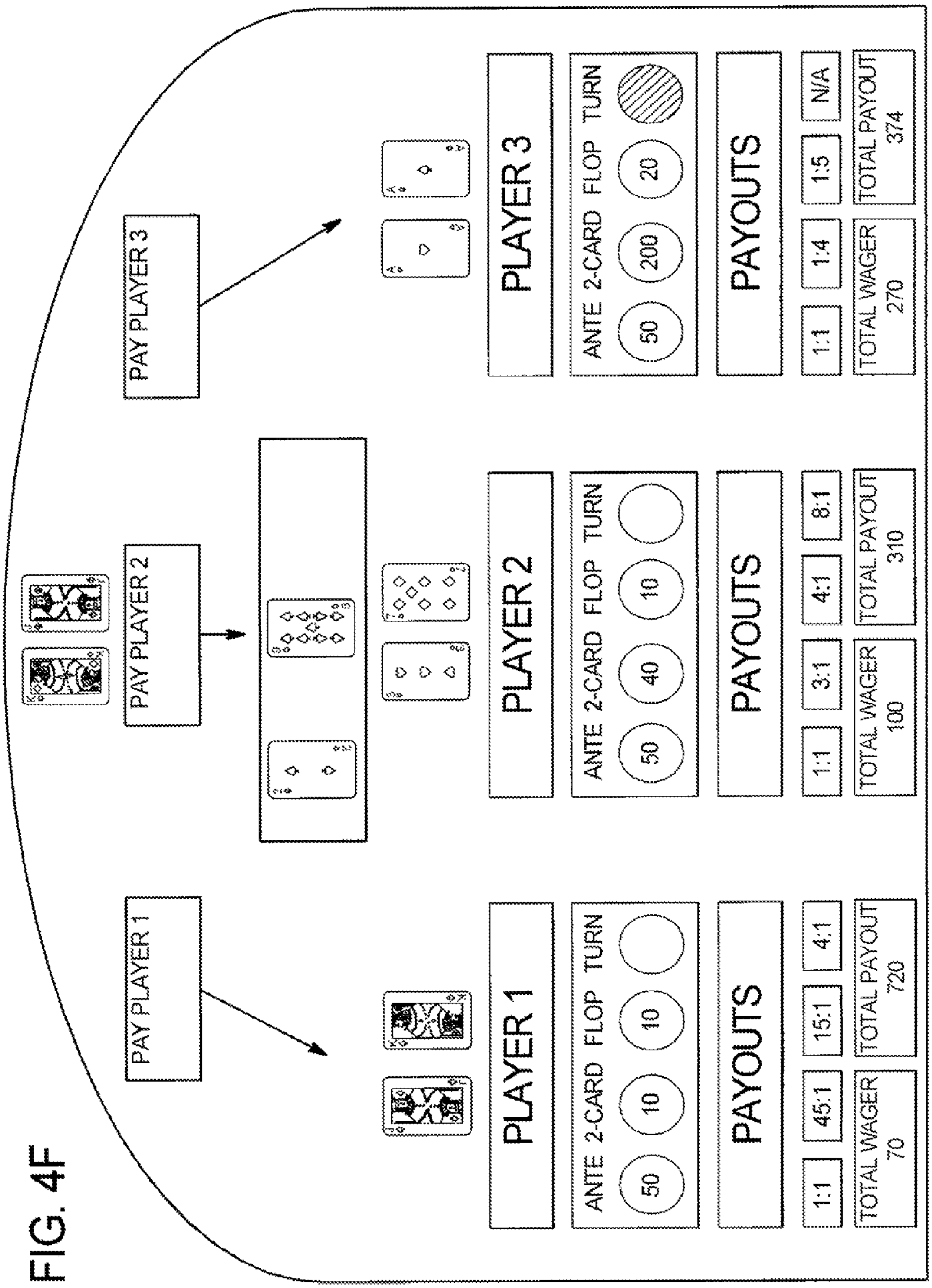

FIG. 4F shows the state of the play of the game that is shown in FIG. 4E, and corresponds to the embodiments described above with respect to FIG. 3A.

As shown in FIG. 4G, player one 126 has chosen to place a wager of thirty credits based on the initially dealt cards 120*a*, the flop card 152, and the turn card 154. Now, player one's 126 total wager is one-hundred (i.e., fifty credit ante wager, ten credit wager on initial cards, ten credit wager on the flop card, and thirty credit wager on the turn card). Based on the associated pay out of 4:1 and the wager of thirty credits, player one's 126 associated pay out is one-hundred fifty credits, as indicated in the summary display 150. The associated pay out of one-hundred fifty credits includes the wager of thirty credits and the award of one-hundred twenty credits (i.e., 4:1 pay out applied to the thirty credit wager). Player two 128 has chosen not to place a wager based on the turn card 150. As mentioned above, player three 130 is not allowed to place a wager, as indicated in the summary display 150.

As shown in FIG. 4G, the gaming device 110 deals the river card 156 in the community play area 140, as indicated also in the message display 142. The river card 156 is the 8♠ and is also a community card that is used in each of the three player hands end the dealer hand 122. At this point, the players and the dealer each have a complete five card hand consisting of their respective initially dealt two card hands, the first community card or flop card 152, the second community card or turn card 154, and the third community card or river card 156. Player one's hand 120*a* is K♠ J♠ 9♠ 8♠ 2♠, which includes a Club Flush, Player two's hand 120*b* includes 9♠ 8♠ 7♦ 3♥ 2 ♠, with a 9♠ as the high card. Player three's hand 120*c* includes A♥ A♠ 9♠ 8♠ 2♠, which includes a pair of Aces. The dealer hand 22 is K♦ J♣ 9♠ 8♠ 2♠, which includes a King high.

As shown in FIG. 4G, the gaming device 110 determines the final hands and displays them to the players in the summary display 150. The gaming device 110 also determines whether the respective player hands have a higher rank than the rank of the dealer hand 122. In this example round of play of the game, player one's hand 120*a* and player three's hand 120*c* outrank the dealer hand 122. With regard to player one's hand 120*a*, a Club Flush is clearly of a higher rank than the dealers 132 King high. With regard to player three's hand 120*c*, the pair of Aces is a higher rank than the dealer's 132 King high. However, because the rank of player two's hand 120*b* (i.e., nine high) ranks lower than the dealer's hand 122, player two 126 forfeits the ante wager and each of the two additional wagers.

The gaming device 110 also determines the total award for player one 126 and player two 130. Player one's 126 total award is eight-hundred seventy, as indicated in the message display 142 and the summary display 150. Player one's award of eight-hundred seventy credits includes: (a) one-hundred credits based on the ante wager; (b) four-hundred sixty credits based on the initial cards wager; (c) one-hundred sixty credits based on the flop card wager; and (d) one-hundred fifty credits based oh the turn card wager. Player three's 130 total award is three-hundred seventy four credits, as indicated in the message display 142 and the summary display 150. Player three's award of three-hundred seventy credits includes: (a) one-hundred credits based on the ante wager; (b) two-hundred fifty credits based on the initial cards wager; and (c) twenty-four credits based on the flop card wager. Therefore, even though player three 130 placed a much higher total wager (i.e., two-hundred seventy credits) than player one 126 (i.e., one-hundred credits), player one 126 receives a larger award that player three because player one's 126 probability of winning were always much lower than that of player three.

Figure 4H:
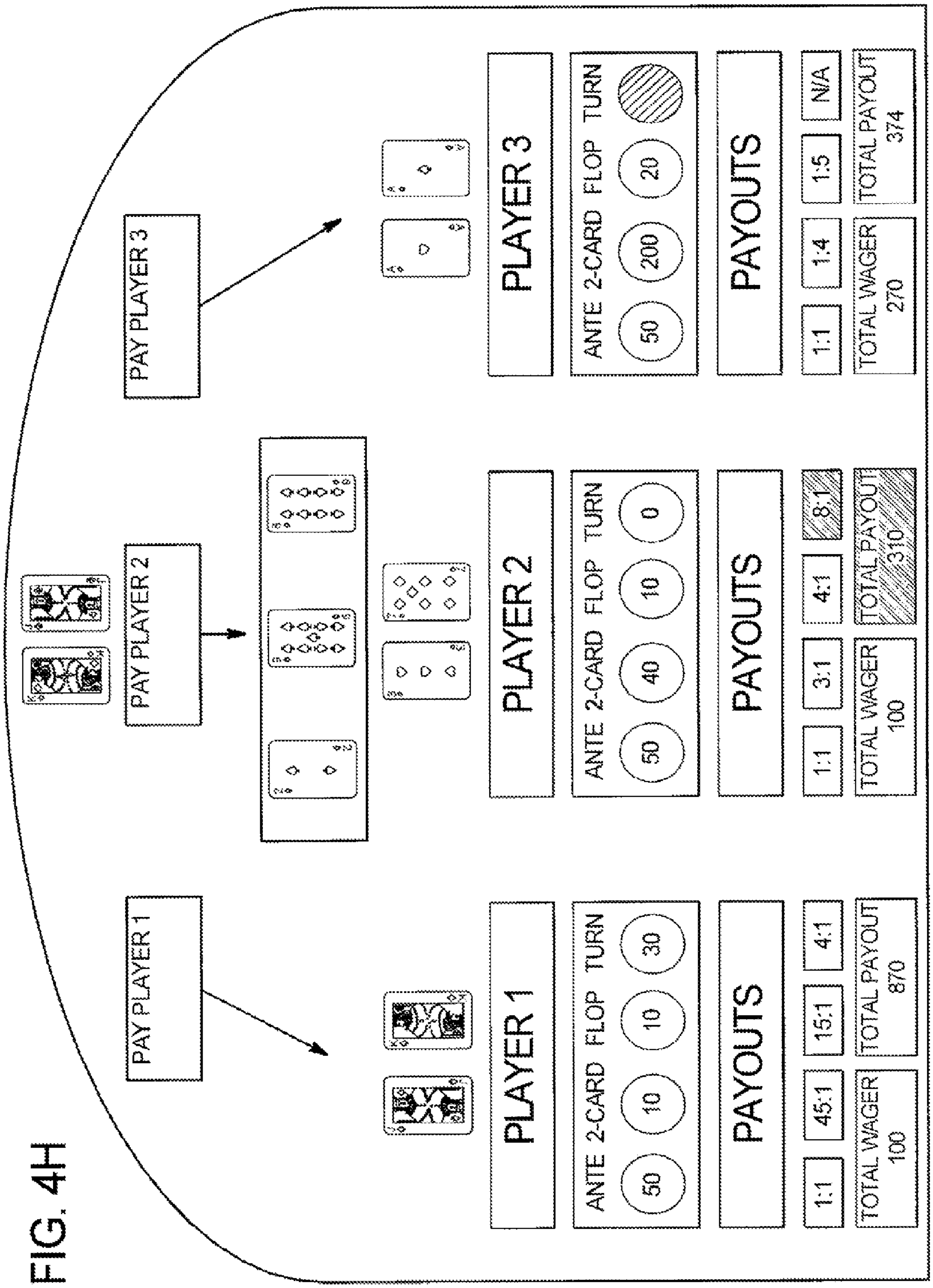

FIG. 4H shows the state of the play of the game that is shown in FIG. 4G, and corresponds to the embodiments described above with respect to FIG. 3A.

In an embodiment, the game is played at a physical gaming table with a live dealer, gaming chips, and one or more standard decks of fifty-two cards. In this embodiment, the gaming table includes a plurality of player positions and a single dealer position. In this embodiment, the gaming table is associated with a tracking system configured to track cards dealt and wagers placed. The tracking devices can be any suitable device capable of identifying the values of physical cards dealt and chips placed on the table, and storing the information into a memory device. The gaming system includes at least one processor configured to process the tracked wager and card information for each player, and calculate the associated pay outs, odds of winning and awards amounts. This relieves the dealer from needing to make complicated calculations and thus facilitates game play. In this embodiment, the gaming table includes one or more displays that are configured to display the associated pay outs and wagers to the players.

In another embodiment, the game is played at a gaming table with a live dealer, and the game includes a virtual deck of cards. That is, in this embodiment, the game is played with standard physical gaming chips but with a virtual deck of cards that are displayed to the player on a display device. Therefore, the dealer's responsibility includes taking in wagers and paying out awards, but does not include dealing the actual cards.

In another embodiment, the game is played at a physical gaming table with a virtual dealer and one or more virtual decks of cards. In this embodiment, the gaming table includes a plurality of player stations, each station having a display and appropriate input/output devices. In another embodiment, the game is played at an individual machine or gaming console and is played by only a single player. In one embodiment, as shown in FIG. 3, the player display 210 includes: (a) a player hand area 220; (b) a community card area 240; (c) a dealer hand area 222; a plurality of pay out display areas 250, 252, 254, 256; (d) a plurality of wager display areas 260, 262, 264 and 266; (e) a total award display 258; and (f) total wager display 268. It should be appreciated that the display may include any other inputs or outputs as described above. The example shown in FIG. 3, is an alternatively type of display configuration from that which is shown in FIGS. 4A to 4D. However, the cards, wagers, pay outs, and awards from FIG. 3 are the same as that which is shown in FIG. 4D. It should be appreciated although a single total award is shown in FIG. 3, that in another embodiment, multiple awards are provided based on the individual wagers.

As described above, in an embodiment, the gaming device incorporates a Texas Hold'em style poker game where the gaming device initially deals each participating player two cards face-up to form two-card player hands. However, it should be appreciated that, in an embodiment, the gaming device or gaming system deals a plurality of two-card player hands to each player. In this embodiment, the player plays each of their hands according to the game rules discussed above. That is, for each of the player hands, the player must make a separate ante, and may place additional wagers after the first two cards and any additional community cards are dealt. It should be appreciated that in another embodiment, the player is only required to place a single ante wager even if the player is playing a plurality of hands.

In one embodiment, where the gaming device includes a Texas Hold'em style poker game as described above, the gaming device provides the player with a single award that is the sum of any awards associated with the ante, and any wagers placed on the initial two-card hand, the flop car, and the turn card. In another embodiment, the gaming device provides the player with individual pay outs for each of the wagers placed.

In one embodiment where the gaming device includes a Texas Hold'em style poker game as described above, the game includes an optional insurance wager. In this embodiment, the player is required to place an ante wager, and may optionally place a wager after the two-card player hand is dealt and after each round of dealing the community cards. However, the player may also place an additional insurance wager to hedge against a very poor hand. In one example, the player places the optional insurance wager at the beginning of a round of play of the game (i.e., at the same time that the ante wager is placed). However, it should be appreciated that the insurance wager may be placed at any other suitable stage of the round of play of the game, such as after the player receives the initial two-card hand. In another embodiment, the player placed the optional insurance wager after receiving the two-card player hand, but before being able to view the two-card dealer hand. The insurance wager compensates the player for an undesirable outcome. In one example, the insurance wager pays off if the player fails to make at least a pair. In another example, the insurance wager pays off if the player fails to make at least ten-high, Jack-high, Queen-high, King-high, Ace-high, or any other suitable low ranking hand. In another embodiment, the insurance wager only pays off if the player has a low ranking hand, as mentioned above, in combination with a relatively high ranking dealer hand. For example, if the player achieved a hand of only ten-high, and the dealer hand was a Full-House, the player would receive an insurance award for this type of bad beat. It should be appreciated that the bad beat insurance payoff may be any suitable combination of a relatively low ranking player hand and a relatively high ranking dealer hand. In another example, if both of the player and the dealer achieve high ranking hands (e.g., a Full-House or Four-Of-A-Kind), but the player hand just slightly ranks below the dealer hand, the player would receive an insurance award.

In one embodiment where the player is able to place an insurance wager, the insurance award is the ability to remove or take back part or all of a previously made wager. For example, in an example round of play of the game, the player makes a fifty credit ante wager, followed by an insurance wager and a four-hundred credit wager after the player receives the initial two-card player hand. In this example, the two-card player hand is AA, and the initial two-card dealer hand is 22. The player placed a relatively large wager of four-hundred credits where the probability of beating the dealer hand is high. However, in this example, the player also chose to place an insurance wager to hedge against a potential losing outcome. In this example, the first community card dealt is a 2 (i.e., the dealer now has a Three-Of-A-Kind of twos), the player would likely ultimately lose the primary wager of four-hundred credits. In this embodiment, because the player placed the insurance wager, the player has the option to remove or take back all or part of the four-hundred credit wager. That is, now that it is less likely that the player will ultimately win the hand, there is an advantage in removing a prior large wager to limit potential losses. Therefore, in this embodiment, if the player ultimately loses to the dealer according to the conditions of the gaming device, although the player will lose the primary wager, the player will at least partially limit this loss through the insurance pull-back option.

In an embodiment, the game is a five-card poker game with three community cards as described above, where the wagering structure is such that the player initial places a plurality of wagers and has, throughout the course of the game, the opportunity to pull back or cancel one or more of the wagers. In one embodiment, the player is required to place four wagers, all of equal amounts, at the beginning of the game. The first wager is an ante wager, the second wager is associated with the initial two-card player hand, the third wager is associated with the flop card community card, and the fourth wager is associated with the turn card community card. For example, at the beginning of a round of play, a player is required to place four equal bets of twenty credits, for a total initial wager of eighty credits. In this embodiment, players are given the option to pull back wagers from the gaming table when the community cards are dealt. It should be appreciated that when the gaming table does not include physical chips, the player can input a request to have one of the wagers withdrawn. Whereas, if the gaming table includes a live dealer and physical chips, the player would generally be required to indicate to the dealer that they wish a wager to be returned and then the dealer would physically move the chips off of the play area so that the player can retrieve the chips. This would avoid confusion and the potential for a player to withdraw more or less chips than is allowed by the game rules. In one embodiment, at least one wager (such as the ante wager) may not be pulled back.

In this embodiment, one example play of the game includes each player placing the four wagers of equal amounts. Next each player is dealt a two-card initial hand, where the cards are dealt face-up. Also, an initial two-card dealer hand is dealt. As in the previous embodiments, the gaming device determines a pay out or pay out ratio based on the two-card hands. The player then has the option to either keep the wager associated with the two-card hand on the table or pull back the wager. As in the previous examples described above, if the player has a low probability of beating the dealer hand, the associated pay out will be relatively high, and if the player has a high probability of beating the dealer hand, the associated pay out will be relatively low. Next, the flop card is dealt and the gaming device calculates and displays another pay out or pay out ratio associated with the initial two-card player hands and the flop card. Then, the player again has the option to pull back or keep the wager in play. This process is the same for the turn card. Accordingly, with a total of four original wagers, each player may pull back up to three wagers (thus leaving only the ante in play), or may let all of the wagers stay in play. In these embodiments, the play of the game is similar to the embodiments described above, but the timing of the wagers is at the beginning of a round of play of the game rather than being placed as the game progresses. It should be appreciated that in other embodiments, the player may be required to keep more than one of the wagers in play. It should also be appreciated that in other embodiments, the amounts of the four wagers need not be equal. It should also be appreciated that in other embodiments, the player must leave the last wager (i.e., the wager associated with the turn card) in play rather than the ante wager.

In an embodiment, the game is a five-card poker game with three community cards as described above, where the players play against each rather than against a dealer hand. In this embodiment, only the player with the highest ranking five card poker hand wins an award. The gaming device includes individual displays for each player to display the odds to the player. In this embodiment, a player with a relatively low ranking initial two-card hand may choose to wager at this stage of the game because the pay out ratio would be relatively high (although their chances of beating all the other players may be relatively small). Also, a player who has a very high ranking starting hand (e.g., AA) may choose to place a large bet because although the player is the most likely to win, the player's pay out ratio would be the lowest at the table. In this embodiment, the pay out ratios may be larger than in the embodiments described above because the player must beat multiple other players rather than just a single dealer. It should be appreciated that the other players may or may not be able to view the odds of the remaining players at the table. Also, it should be appreciated that in another embodiment, each of the players at the table are able to view the one or both of the cards of the other players at the table.

In an embodiment, the game is a poker game with a number of community cards as described above, where the players play against each rather than against a dealer hand. In this embodiment, the gaming establishment banks at least a portion of the game. At the beginning of a round of play of the game, each of the players must place an Ante wager. All of the Ante wagers go into a pool and the winning player hand takes the pool of Ante wagers. It should be appreciated that the gaming establishment may or may not collect a portion of the Ante wagers as a commission or vig. In this embodiment, all of the Play wagers (i.e., the wagers based on the odds of a player beating all of the other players) are banked by the house. That is, each losing player loses all of these wagers, but these lost wagers do not contribute to a pot that the winning player collects. Rather, the gaming establishment provides an award to the winning player from casino funds and based on the pay out odds associated with the Play wagers. It should also be appreciated that in other embodiments, the house or gaming establishment may collect a portion of the Play wagers as a vig, such as 5% of the Play wagers from each player.

In an embodiment, the game is a poker game as described above. However, in this embodiment, the number of community cards is five as in a traditional game of Texas Hold'em. In this embodiment, the gaming device deals an initial two-card hand to each of the players and deals a two-card dealer hand. Each of the players place and Ante wager and are paid an Ante award if their respective final player hand beats the final dealer hand. The five community cards include three flop cards, a single turn card, and a single river card. The gaming system enables the players to place optional Play wagers after the initial two-card hands are dealt, after the flop cards are dealt, and after the turn cards are dealt. The gaming system provides the winning player with a Play award which is based on the play wagers and the payout odds associated with each of the individual Play wagers.

In one embodiment, the gaming system displays to the player how much they will make per dollar wagered, rather than displaying the odds to win. In this embodiment, the player can gauge whether or not they stand to make a large return on their investment.

In an embodiment, the game is a five-card poker game with three community cards as described above, where the player plays against the dealer hand. In this embodiment, the player can place and optional side wager at the beginning of a round of play of the game. However, if the player beats all the other players at the table, the naming device provides the player with a bonus award. The bonus award may be based, at least in part, on the wagers made by the player during the round of play of the game. In another embodiment, in order to achieve the bonus award, the player must have a higher ranking hand than all the player hands and the dealer hand.

In another embodiment, a player is able to place a side wager at the beginning of the game and if the player achieves a sufficiently high ranking hand such as a Royal Flush, then the gaming device provides the player with a bonus award. It should be appreciated that in another embodiment, a side wager is not required for the player to receive a bonus award with a high ranking hand.

In another embodiment, the gaming device provides the player with a bad beat award when the player achieves a sufficiently high ranking hand, yet nevertheless loses to the dealer hand. For example, the player may achieve a Four-OF-A-Kind and lose to a dealer hand with a Royal Flush. In this embodiment, the bad beat award at least partially compensated the player for a particularly frustrating loss in the primary five card poker game. In one embodiment the player may place an optional wager to be eligible for the bad beat award. In this embodiment, at least a portion of the optional wager contributes to a progressive award fund. When any of the players achieve a qualifying bad beat hand and have placed the optional side wager for that round of play of the game, the gaming device provides the player with the bad beat award that is taken from the progressive award fund.

In one embodiment, the gaming system enables each of the players to place optional side wagers on other players' hands. In one example of this embodiment, a first player may have a particularly low ranking hand, which results in a low probability of winning and a relatively high associated odds payout. A second player may have a particularly high ranking hand, which results in a high probability of winning and a relatively low associated odds payout. Therefore, the first player can forego the option to place a relatively risky wager on their own hand and instead place a wager on the second player who has a high ranking hand. In this embodiment, by allowing the players to place wagers on other players' hands, each of the players can control to a certain extent their risk levels and associated odds payouts. Because the long term expected payout for each of the player is the same, it is of little or no disadvantage to the casino to allow one player to place a wager on another player's hand. In one embodiment, the gaming establishment may collect a vig or a small percentage of wagers placed on other player hands.

In one embodiment, the gaming system recalculates the odds payout at different stages of the card game. However, in this embodiment, the odds payouts are based, in part on the values of the player and dealer cards, and in part on another event in the game. In one example, the gaming system randomly generates a modifier to the calculated odds payouts such that the players have a higher or lower overall rate of return than they would have had based on consideration of the player and dealer cards alone. It should be appreciated that in other embodiments, the payout associated with a secondary wager is based on factors other than the odds of a particular player winning the play of the game.

In one embodiment, the gaming system fixes the amount a player can win for a particular wagering opportunity. However, in this embodiment, the amount that must be wagered to win the fixed award will vary based on the relative strength of a player's hand. In an example, the amount a player can win is fixed to be fifty credits. For a first player who has a poor hand (i.e., a relatively low chance of winning), the required wager would a low value such as five credits. However, for a second player who has a very strong hand (i.e., a relatively high chance of winning), the required wager would a high value such as forty credits. Because the long term payout for each player is the same or nearly the same, there is little or no statistical advantage to wagering on a poor hand. Moreover, the first player with the poor starting hand must risk very little money to potentially win the same award as the second player placing the relatively large wager.

In other embodiments, the primary game may be a different game other than the five card poker game described above. For example, the game may be a Blackjack game, a slot game, or any other syllable game where there are multiple betting opportunities. In these embodiment, a probability of winning is calculated prior to each wagering opportunity and the player can place an optional wager based on a calculated pay out or pay out ratio.

In one embodiment, the gaming system operates over a network such as the Internet. In this embodiment, the gaming system connects to remote terminals such that a plurality of player can participate in the game while in physical proximity to one another. In an embodiment, the gaming system is implemented over a network and limited to a particular gaming establishment such as a casino. In this embodiment, multiple players can be seated at individual gaming consoles that are stationed at various locations through the casino and all be connected and participating in the same game. In another embodiment, the gaming system is implemented or a network and through a plurality of different gaming establishments. In another embodiment, the gaming system is implemented over a network in one or more gaming establishments and over the Internet. In this embodiment, different players can participate in the same game while separately located at multiple locations within a gaming establishment and from one or more remote terminals such as a home personal computer connected to the Internet.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing and including an acceptor;

at least one display device supported by the housing;

at least one processor; and at least one memory device storing a plurality of instructions which, when executed by the at least one processor, cause the at least one processor to operate with the at least one display device and the plurality of input devices to:

(a) establish a credit balance based on a monetary value associated with a physical item after the acceptor receives the physical item;

(b) after receiving an actuation of a game initiation button, place a separate wager for each of a plurality of different stages of a game, the credit balance being decreasable by the wagers;

(c) after placement of the wagers, for each of the plurality of different stages of the game:

(1) determine a probability of achieving a winning outcome of the game based on a state of the game in said stage;

(2) determine a payout associated with said stage of the game, the payout being inversely related to the probability of achieving the winning outcome of the game associated with said stage of the game;

(3) display the determined payout;

(4) enable withdrawal of the wager associated with said stage of the game;

(5) if a withdrawal input is received for said stage, withdraw the wager associated with said stage of the game and not determine any awards for said stage of the game; and (6) complete said stage of the game;

(d) after all of the plurality of different stages of the game have been completed, determine an outcome of the game;

(e) display an award if the determined outcome is the winning outcome, said award including a sum of each non-withdrawn wager multiplied by the payout associated with the stage associated with said non-withdrawn wager, the credit balance being increasable by said award; and (f) initiate a payout associated with the credit balance after receiving an actuation of a cashout button.

2. The gaming system of claim 1, wherein each of said wagers is of an equal amount.

3. The gaming system of claim 1, wherein the game is a card game including a two-card player hand, a two-card dealer hand, and a plurality of community cards.

4. The gaming system of claim 3, wherein a first stage of the game occurs after the two-card player hand is dealt, a second stage of the game occurs after a first set of the community cards has been dealt, and a third stage of the game occurs after a second set of the community cards has been dealt.

5. The gaming system of claim 4, wherein the second set of the community cards is a single card.

6. A method of operating a gaming system, said method comprising:

(a) causing at least one processor to execute a plurality of instructions stored on at least one memory device to establish a credit balance based on a monetary value associated with a physical item after an acceptor of the gaming system receives the physical item;

(b) after receiving an actuation of a game initiation button, causing the at least one processor to execute the plurality of instructions to place a separate wager for each of a plurality of different stages of a game, the credit balance being decreasable by the wagers;

(c) after placement of the wagers, for each of the plurality of different stages of the game:

(1) causing the at least one processor to execute the plurality of instructions to determine a probability of achieving a winning outcome of the game based on a state of the game in said stage;

(2) causing the at least one processor to execute the plurality of instructions to determine a payout associated with said stage of the game, the payout being inversely related to the probability of achieving the winning outcome of the game associated with said stage of the game;

(3) causing the at least one processor to execute the plurality of instructions to operate with at least one display device to display the determined payout;

(4) enabling withdrawal of the wager associated with said stage of the game;

(5) if a withdrawal input is received for said stage, causing the at least one processor to execute the plurality of instructions to withdraw the wager associated with said stage of game and not determine any awards for said stage of the game;

(6) causing the at least one processor to execute the plurality of instructions to complete said stage of the game;

(d) after all of the plurality of different stages of the game have been completed, causing the at least one processor to execute the plurality of instructions to determine an outcome of the game;

(e) causing the at least one processor to execute the plurality of instructions to operate with the at least one display device to display an award if the determined outcome is the winning outcome, said award including a sum of each non-withdrawn wager multiplied by the payout associated with the stage associated with said non-withdrawn wager, the credit balance being increasable by said award; and (f) causing the at least one processor to execute the plurality of instructions to initiate a payout associated with the credit balance after receiving an actuation of a cashout button.

7. The method of claim 6 , wherein each of said wagers is of an equal amount.

8. The method of claim 6 , wherein the game is a card game including a two-card player hand, a two-card dealer hand, and a plurality of community cards.

9. The method of claim 8, wherein a first stage of the game occurs after the two-card player hand is dealt, a second stage of the game occurs after a first set of the community cards has been dealt, and a third stage of the game occurs after a second set of the community cards has been dealt.

10. The method of claim 9, wherein the second set of the community cards is a single card.

11. The method of claim 6, which is at least partially provided through a data network.

12. The method of claim 11, wherein the data network is an internet.

13. A non-transitory computer readable medium storing a plurality of instructions which, when executed by at least one processor, cause the at least one processor to:

(a) establish a credit balance based on a monetary value associated with a physical item after an acceptor receives the physical item;

(b) after an actuation of a game initiation button is received, place a separate wager for each of a plurality of different stages of a game, the credit balance being decreasable by the wagers;

(c) after placement of the wagers, for each of the plurality of different stages of the game:

(1) determine a probability of achieving a winning outcome of the game based on a state of the game in said stage;

(2) determine a payout associated with said stage of the game, the payout being inversely related to the probability of achieving the winning outcome of the game associated with said stage of the game;

(3) cause at least one display device to display the determined payout;

(4) enable withdrawal of the wager associated with said stage of the game;

(5) if a withdrawal input is received for said stage, withdraw the wager associated with said stage of the game and do not determine any awards for said stage of the game; and (6) complete said stage of advance the game;

(d) after all of the plurality of different stages of the game have been completed, determine an outcome of the game;

(e) cause the at least one display device to display an award if the determined outcome is the winning outcome, said award including a sum of each non-withdrawn wager multiplied by the payout associated with the stage associated with said non-withdrawn wager, the credit balance being increasable by said award; and (f) initiate a payout associated with the credit balance after an actuation of a cashout button is received.

14. The non-transitory computer readable medium of claim 13 , wherein each of said wagers is of an equal amount.

15. The non-transitory computer readable medium of claim 13 , wherein the game is a card game including a two-card player hand, a two-card dealer hand, and a plurality of community cards.

16. The non-transitory computer readable medium of claim 15, wherein a first stage of the game occurs after the two-card player hand is dealt, a second stage of the game occurs after a first set of the community cards has been dealt, and a third stage of the game occurs after a second set of the community cards has been dealt.

17. The non-transitory computer readable medium of claim 16, wherein the second set of the community cards is a single card.

* * * * *